United States Patent

Kawamura et al.

[11] Patent Number: 5,812,511
[45] Date of Patent: Sep. 22, 1998

[54] DISK RECORDING AND REPRODUCING APPARATUS

[75] Inventors: Ichiro Kawamura, Osaka; Hirofumi Furukawa, Katano; Shinichi Maeda, Higashiosaka, all of Japan

[73] Assignee: Matsushita Electric Industrial Co., Ltd., Osaka, Japan

[21] Appl. No.: 751,956

[22] Filed: Nov. 19, 1996

Related U.S. Application Data

[63] Continuation of Ser. No. 310,755, Sep. 29, 1994, abandoned.

[30] Foreign Application Priority Data

Sep. 29, 1993 [JP] Japan .................................. 5-242459
Oct. 12, 1993 [JP] Japan .................................. 5-254074
Sep. 20, 1994 [JP] Japan .................................. 6-224705

[51] Int. Cl.⁶ .......................................... G11B 33/02
[52] U.S. Cl. .......................................... 369/77.2
[58] Field of Search .................... 369/75.1, 75.2, 369/77.1, 77.2, 36; 360/92

[56] References Cited

U.S. PATENT DOCUMENTS

| | | | |
|---|---|---|---|
| 4,618,900 | 10/1986 | Saito | 360/97 |
| 4,736,358 | 4/1988 | Hoshi et al. | 369/77.2 |
| 5,105,414 | 4/1992 | Funabashi et al. | 369/75.2 |
| 5,166,918 | 11/1992 | Kamijo | 369/77.1 |
| 5,181,197 | 1/1993 | Sugie et al. | 369/75.2 |
| 5,432,654 | 7/1995 | Ooka | 360/92 |

FOREIGN PATENT DOCUMENTS

| | | |
|---|---|---|
| 0 518 259 | 12/1992 | European Pat. Off. . |
| 0 576 253 | 12/1993 | European Pat. Off. . |
| 0 616 322 | 9/1994 | European Pat. Off. . |

*Primary Examiner*—Stuart S. Levy
*Assistant Examiner*—George J. Letscher
*Attorney, Agent, or Firm*—McDermott, Will & Emery

[57] ABSTRACT

A recording and reproducing apparatus using high density recording disk, such as optical disk. The recording and reproducing device of this invention can accommodated both disk and disk cartridges of a plurality of differing sizes. Because this invention can accommodate both disk and disk cartridges, a single device that can both record and reproduce information to or from a high density disk is achieved.

14 Claims, 26 Drawing Sheets

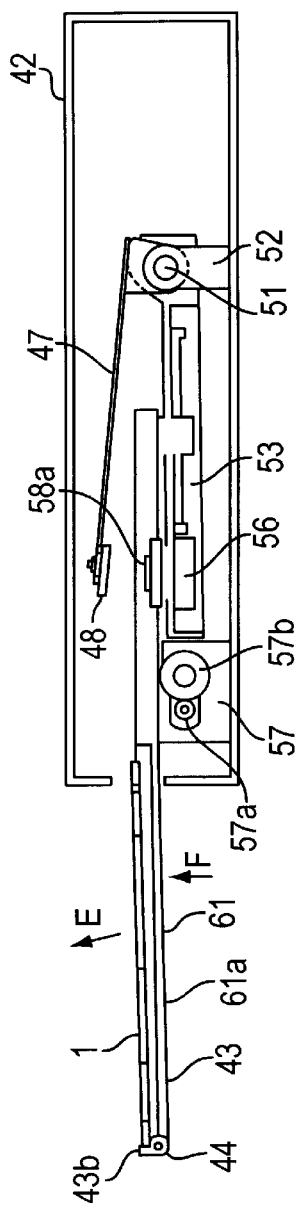
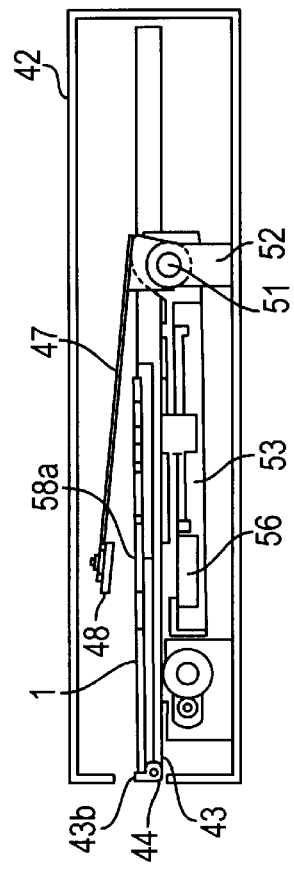
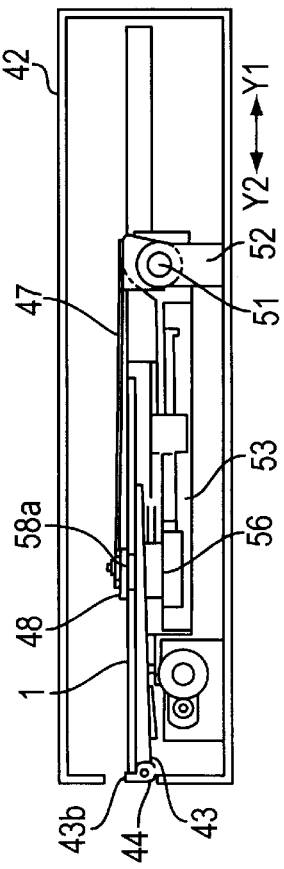

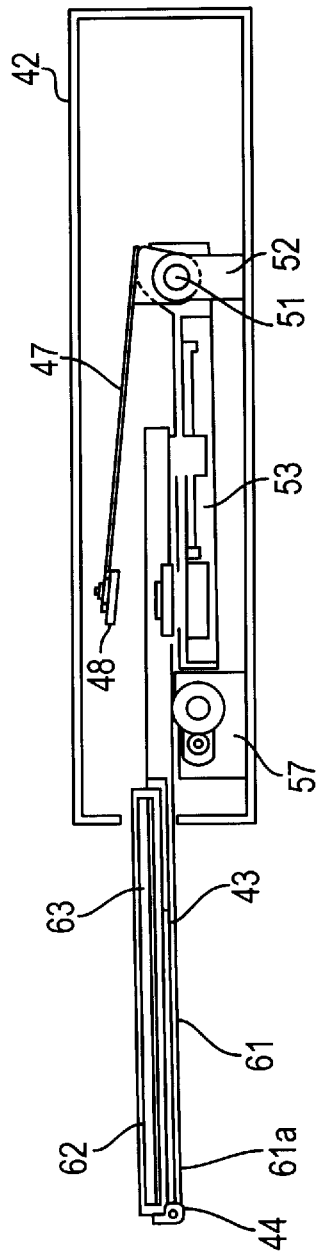
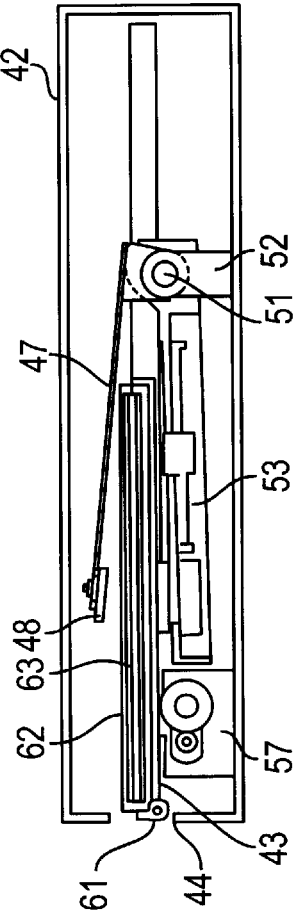
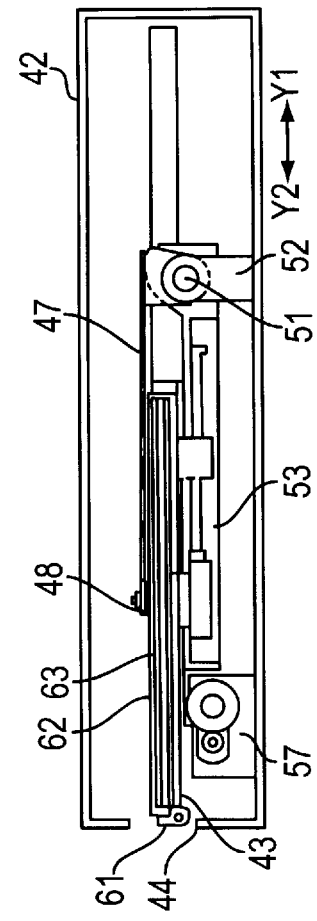

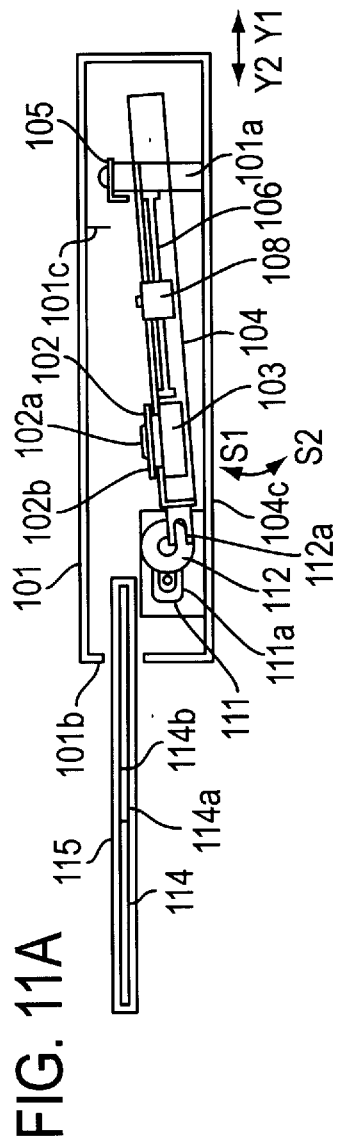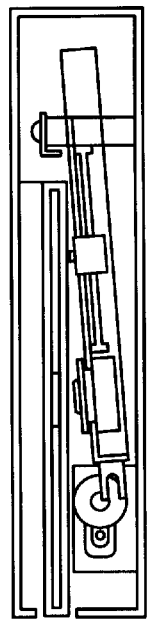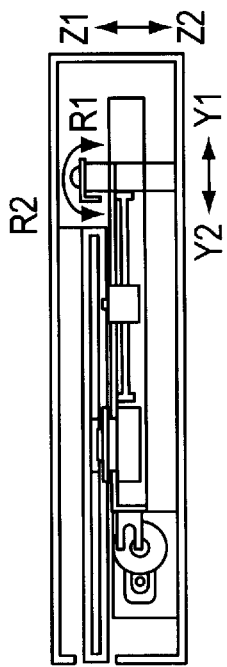

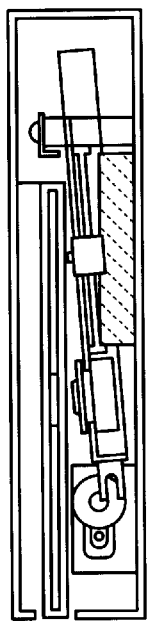
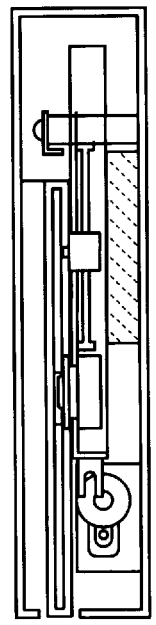
FIG. 14A  FIG. 14B  FIG. 14C

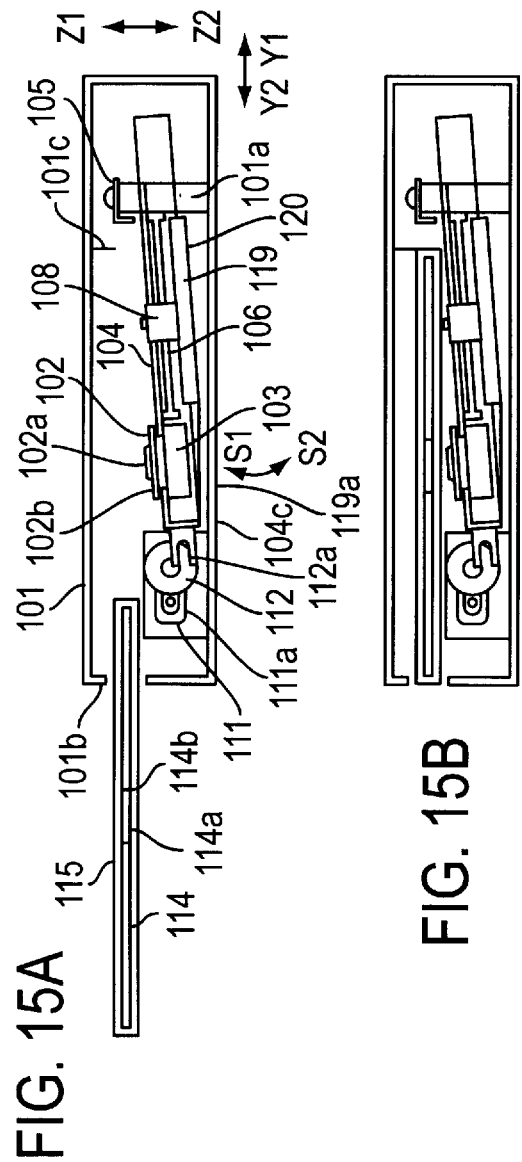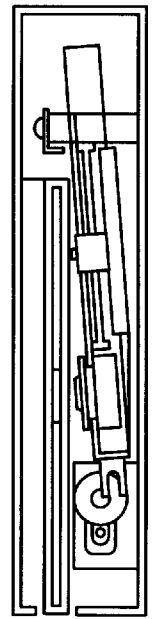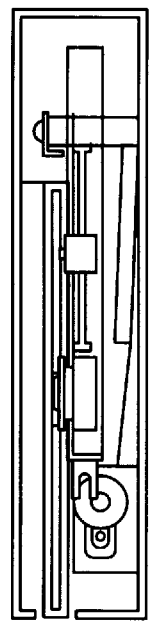

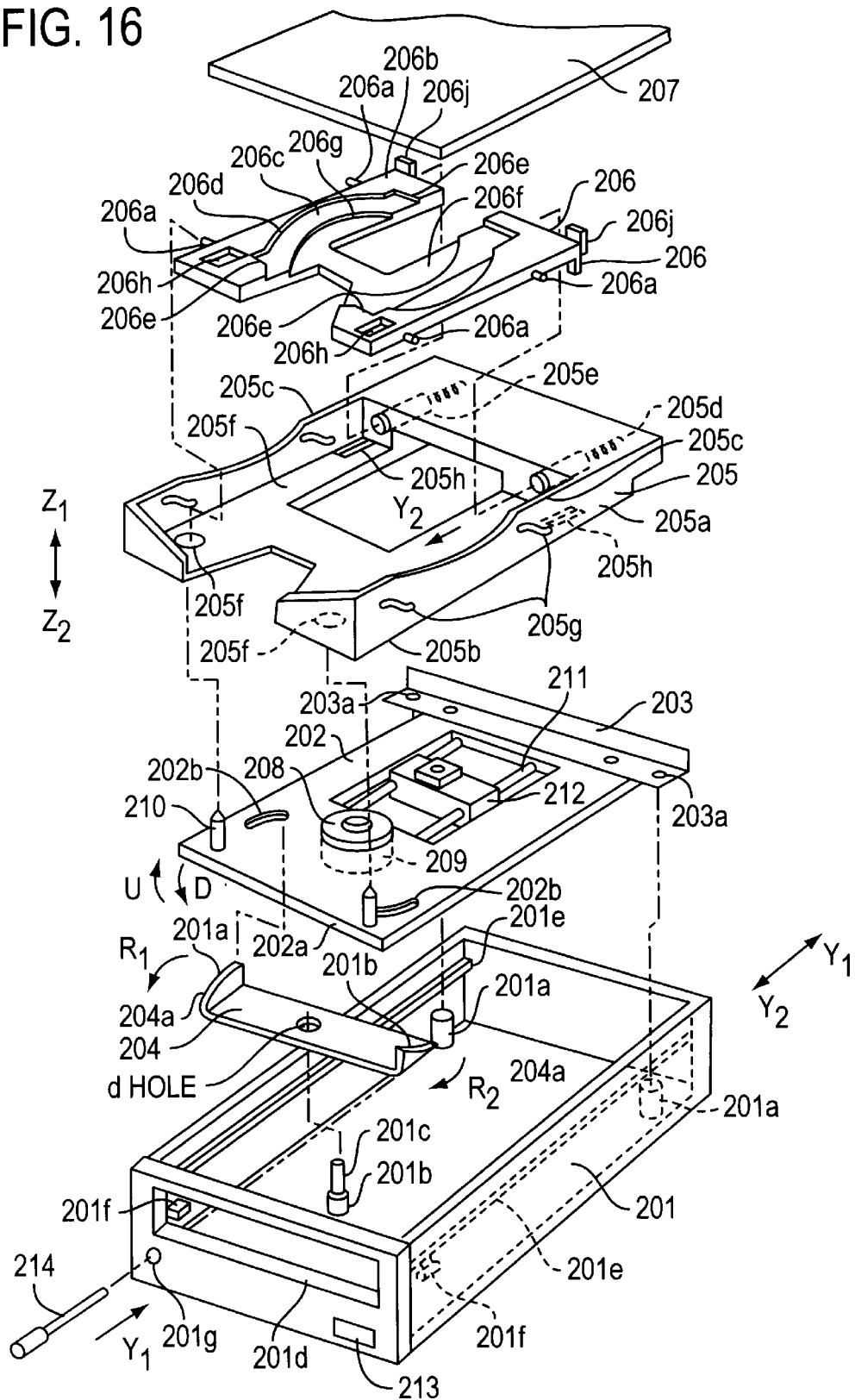

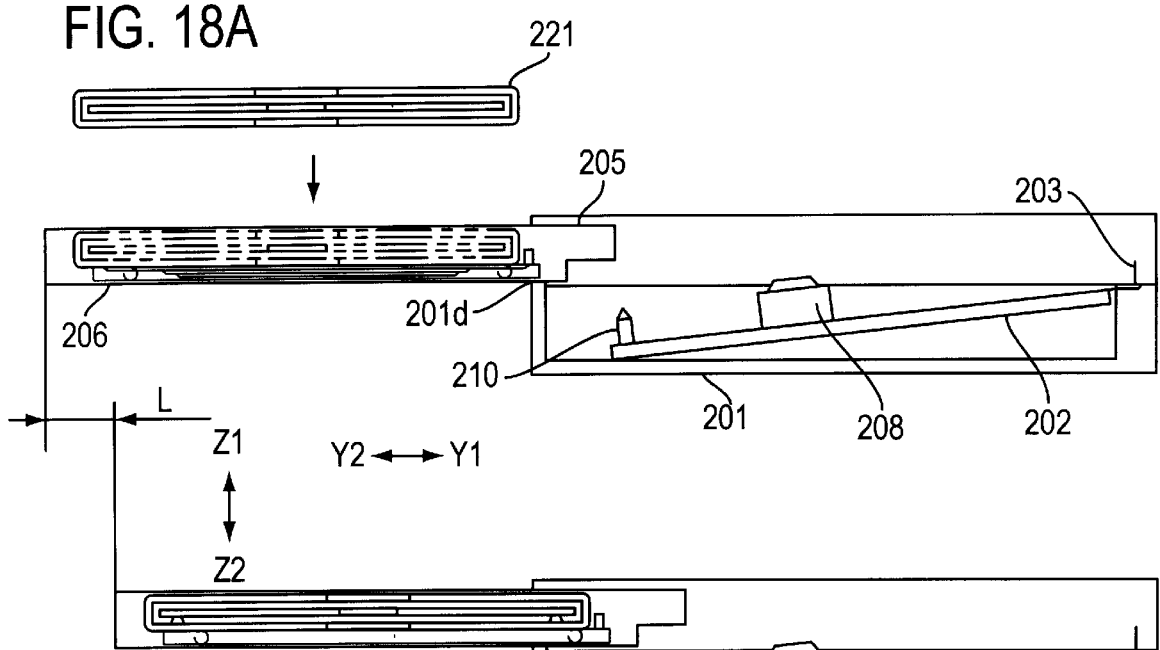
FIG. 18A
FIG. 18B
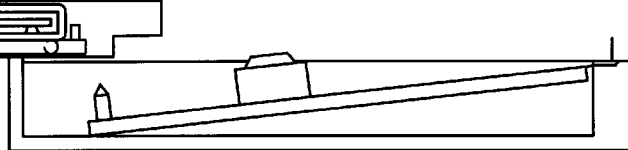
FIG. 18C
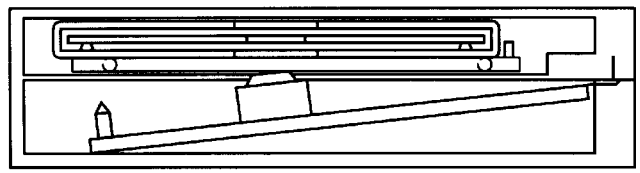
FIG. 18D
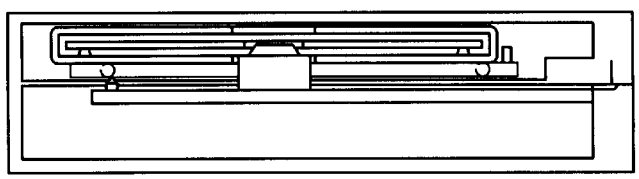

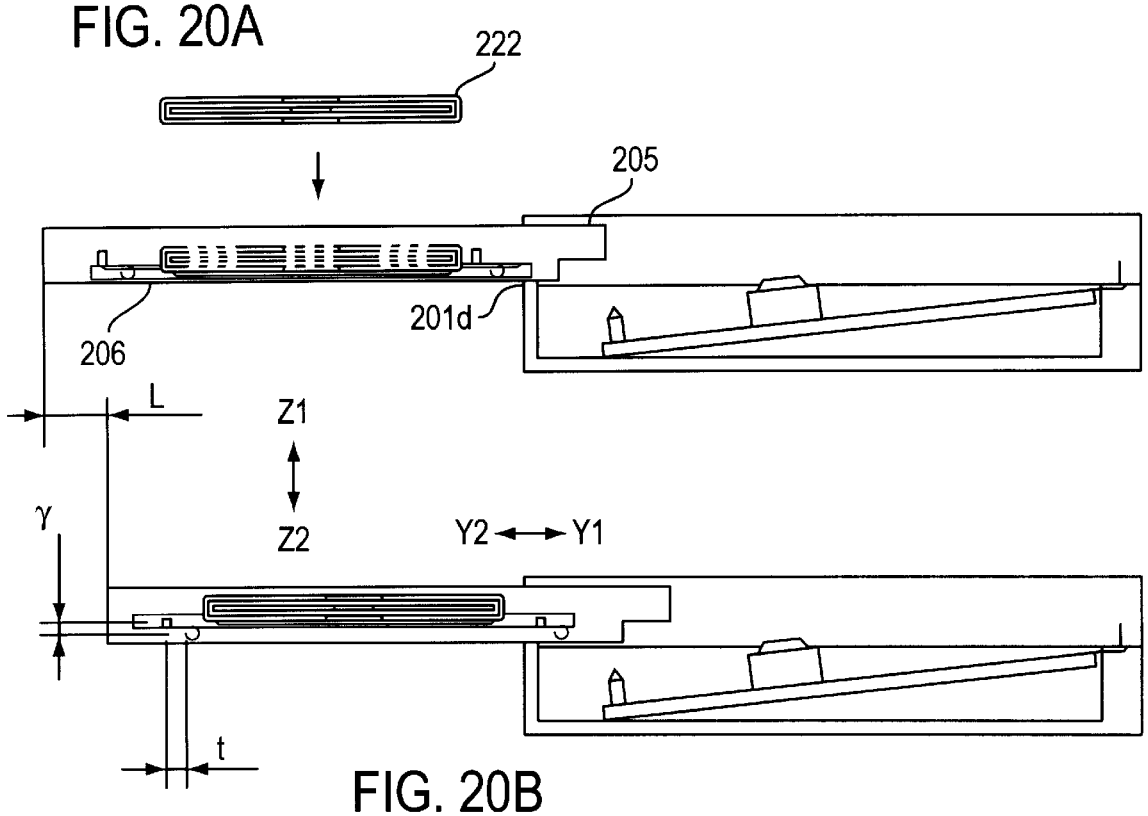
FIG. 20A
FIG. 20B
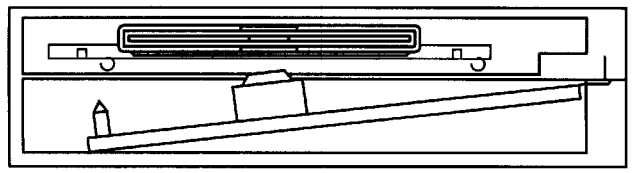
FIG. 20C
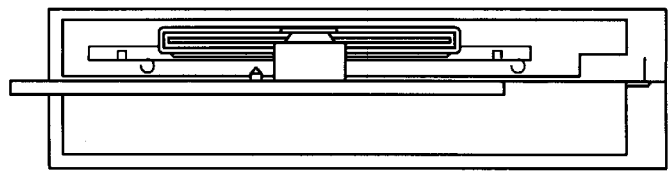
FIG. 20D

FIG. 21A
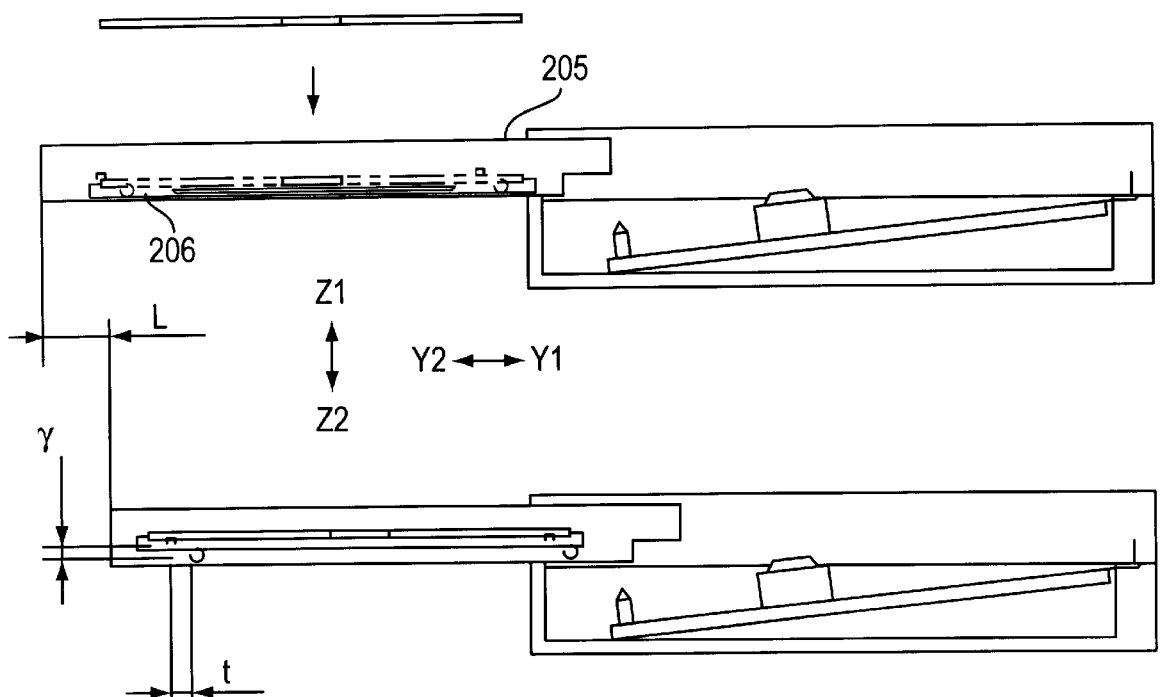
FIG. 21B
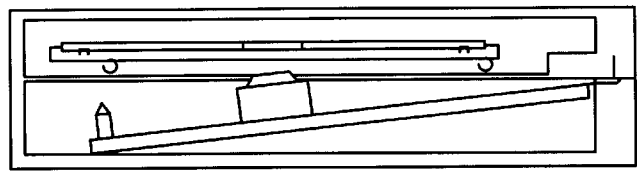
FIG. 21C
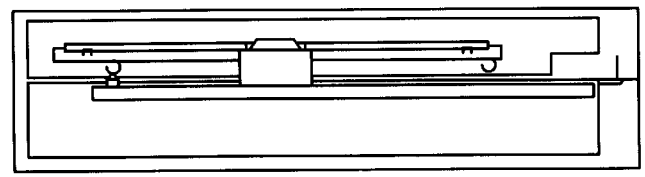
FIG. 21D

FIG. 22A
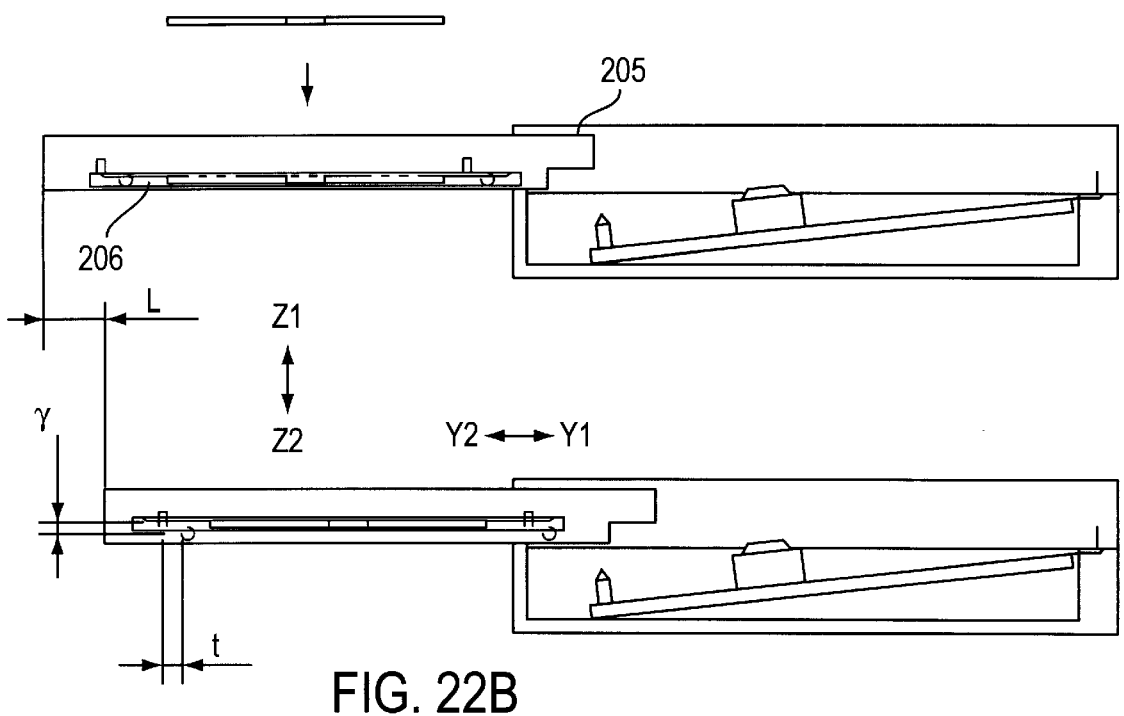
FIG. 22B
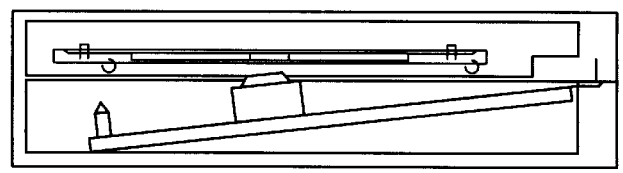
FIG. 22C
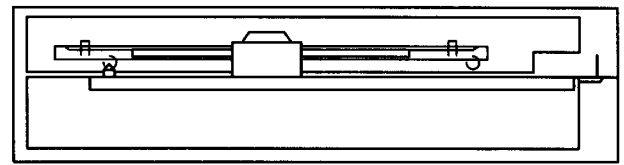
FIG. 22D

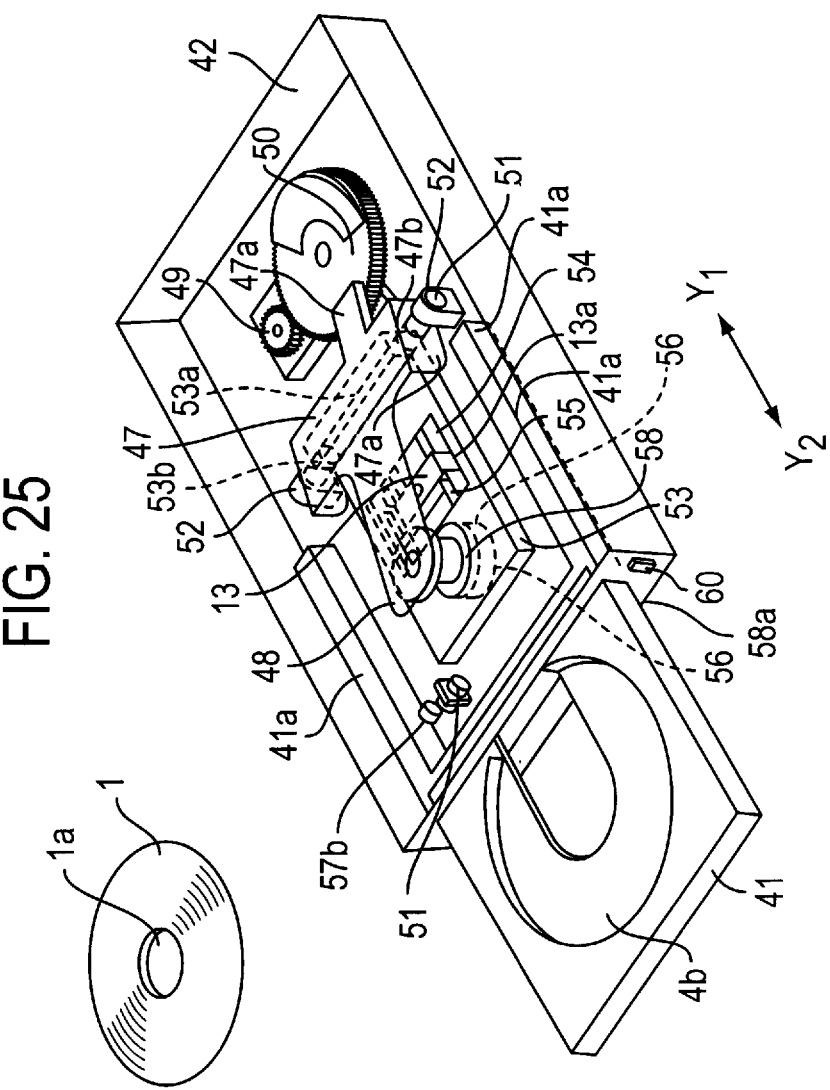

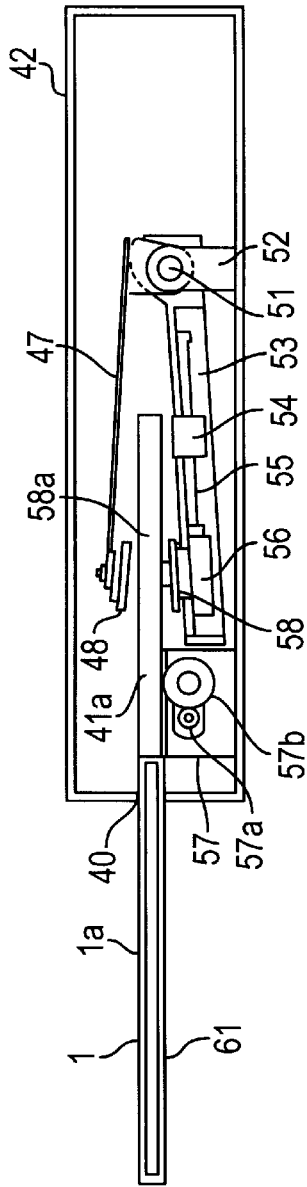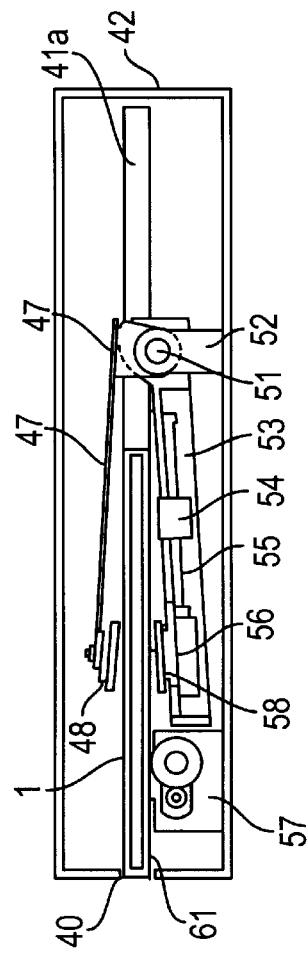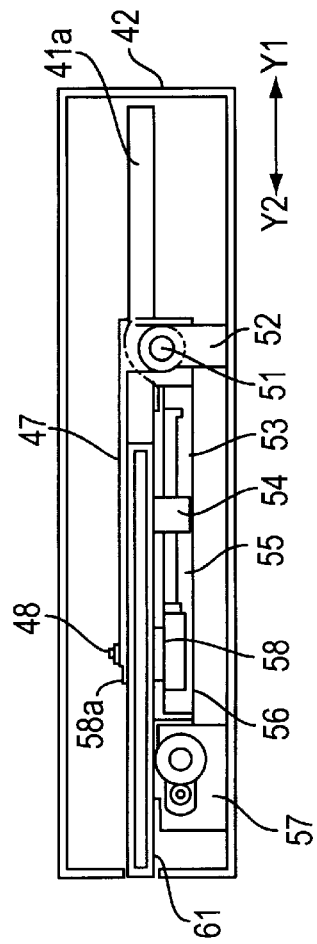

DISK RECORDING AND REPRODUCING APPARATUS

This is a continuation application of application Ser. No. 08/310,755, filed Sep. 29, 1994, now abandoned.

FIELD OF THE INVENTION

The present invention relates to a mechanical constitution of a recording and reproducing apparatus using a high density recording disk such as an optical disk. More particularly, it relates to a constitution possessing means for recording or reproducing signals by mounting recording disks accommodated in plural types of disk cartridges differing in size, or recording or reproducing signals by mounting one or plural types of recording disks alone differing in size and recording disks accommodated in one or plural types of disk cartridges differing in size.

BACKGROUND OF THE INVENTION

Features of optical disk include high recording density, long life of medium because of contact-free recording and reproducing, and rapid random access as compared with other media such as tape, among others. Accordingly, it is recently used in many applications such as compact disc (CD) as play-only machine, image file data file, document file, and others, as recording and reproducing machine.

In the apparatus for recording/reproducing by using such optical disk, a perspective view of prior art of loading mechanism for mounting the disk is shown in FIG. 25, and sectional views for showing its operation are given in FIG. 26 (a) to (c).

A main chassis 53 comprises a head 13, a magnetic yoke 54 for linear motor, and a disk motor 56. This head 13 has a coil 13a for linear motor, and it is guided so as to slide in Y1 and Y2 directions by a guide shaft 55.

A turntable 58 is mounted on the shaft of the disk motor 56. This turntable 58 has a center cone 58a to be engaged with a central hole 1a of a recording disk 1.

At one end 53a of the main chassis 53, a hole 53b for fulcrum for rotation is provided, and a rotary support shaft 51 is passed in the hole 53b. Likewise, at one end 47a of a clamp arm 47, a holed 47b for fulcrum for rotation is provided, and the rotary support shaft 51 is also passed in the hole 47b, and the rotary support shaft 51 is fixed at a protrusion 52 in a casing 42. A tray 41 is disposed inside the casing 42 so as to move parallel in Y1, Y2 directions along with rotation of a loading motor 57, as a rack 41a provided at its back is engaged and driven with an output gear 57b of the loading motor 57 on which a gear head 57a for deceleration is mounted (see FIG. 26 (a)). In the tray 41, a dish-like recess 46 for mounting and holding the recording disk 1 is formed.

A cam 50 is engaged with the main chassis 53 and the rear end 47a of the clamp arm 47. The rear end of the main chassis 53 and the rear end 47a of the clamp arm 47 are always pressed to the cam 50 by springs not shown in the drawing. The cam 50 is driven and rotated by a geared motor 49. Depending on the rotating position of the cam 50, the main chassis 53 and clamp arm 47 are designed to come closer to each other or depart from each other.

The operation of the loading motor 57 and geared motor 49 is usually controlled sequentially by the microcomputer. The position of the tray 41 or cam 50 driven by respective motors is detected usually by a microswitch or the like. This is the conventional method and is not shown or explained herein.

FIG. 26 (a) to (c) show the operation of loading mechanism of thus composed prior art. When the recording disk 1 is used in a disk recording and reproducing apparatus, by pressing an eject/load switch 60, first the cam 50 is rotated by the geared motor 49 through microcomputer control, and the clamp arm 47 and main chassis 53 are set in upper and lower apart positions across the rotary support shaft 51. As being driven by the loading motor 57, the tray 41 is moved in Y2 direction to go out of the casing 42, and is set in the state in FIG. 26 (a). In this state, by putting the recording disk 1 in the recess 46 of the tray 41 and pressing the eject/load switch 60, the tray 41 is driven by the loading motor 57, and transferred parallel in the casing 42 to be in the state in FIG. 26 (b). In succession, the cam 50 is rotated by the geared motor 49, and the clamp arm 47 and main chassis 53 come closer to each other about the rotary support shaft 51 as shown in FIG. 26 (c), and the recording disk 1 is held between a clamper 48 and the turntable 58 of the disk motor 56, and is engaged with the center cone 58a of the turntable 58 to be ready to rotate. In this state, reproduction of information from the recording disk 1 or recording of information into it are effected by the head 13.

When unloading the recording disk 1 from the apparatus, exactly a reverse action of the loading action above is carried out.

The constitution of such prior art, however, can be applied in the recording apparatus of play-only recording disk such as CD and CD-ROM not contained in a protective disk cartridge, but a recordable disk is generally contained in a protective disk cartridge, and hence cannot be put in the shown apparatus, and a different apparatus was needed, and both the recording disk alone and the recording disk contained in a disk cartridge cannot be handled by one disk recording and reproducing apparatus.

Besides, the recording disks put in disk cartridges of different sizes can be used only in individual exclusive recording and reproducing apparatus.

Moreover, in the constitution of the prior art, because of the rotary action of the main chassis 53 in FIG. 25, a clearance is needed between the rotary support shaft 52 for main chassis, and the hole 53b for fulcrum for rotation of the main chassis 53, and looseness or unnecessary vibration of the main chassis 53 against the casing 42 cannot be avoided. By this looseness, specific vibration caused on the main chassis 53 by the rotation of the disk motor 56 or operation of the head 13 during signal recording or reproduction process may increase, and a resonance phenomenon of a relatively low frequency is likely to occur.

Furthermore, the head 13 requires high speed operation, and a linear motor or the like is used, but in the case of linear motor or the like, when the power source is cut off, position holding force is often eliminated, and when the power source of the apparatus is cut off in an inclined state of the chassis as shown in FIG. 26 (a) and the place of installation is moved, for example, careless handling in the shown state causes the head 13 to be shaken largely right and left on the guide shaft 55, or to be hit hard against the position defining member, thereby leading to troubles of head and the like.

To solve these problems, it is a first object of the invention to present a disk recording and reproducing apparatus capable of recording or reproducing signals by mounting either one or plural types of recording disks alone differing in size, or recording disks accommodated in one or plural types of disk cartridges differing in size.

It is a second object of the invention to present a disk recording and reproducing apparatus capable of rotating and moving the main chassis stably by eliminating looseness of the main chassis, and effectively protecting the head in a power cut-off state.

SUMMARY OF THE INVENTION

As first means corresponding to the first object, the invention presents a disk recording and reproducing apparatus comprising:

a main chassis possessing a turntable rotated by a disk driving motor to be coupled with a driven part of a recording and reproducing medium, possessing a head for recording into or reproducing from the recording and reproducing medium, taking a first position not coupling with the recording and reproducing medium, and taking second position coupling with the recording and reproducing medium, and a tray for mounting the recording and reproducing medium at the first position directly or through an auxiliary part, and coupling the driven part of the recording and reproducing medium with the turntable on the main chassis at the second position.

As second means thereof, the invention presents a disk recording and reproducing apparatus comprising:

a main chassis comprising a turntable rotated by a disk driving motor to be coupled with a driven part of a recording and reproducing medium, and a head for recording into or reproducing from the recording and reproducing medium, for mounting a disk alone which is a first recording and reproducing medium on the turntable at the first position, and recording and reproducing the first recording medium at the second position as being coupled with a driven part of the disk alone, and cartridge holding means for accommodating a cartridge which is a second recording and reproducing medium at the first position of the main chassis in order to use the cartridge of the second recording and reproducing medium, coupling the cartridge of the second recording and reproducing medium with the turntable and the driven part of the disk accommodated in the cartridge until reaching the second position, and recording and reproducing the second recording and reproducing medium at the second position of the main chassis.

As third means thereof, in addition to the constitution of the first means, a holder arranged one or plural types of disks alone which are first recording and reproducing media, concentrically and putting those of larger diameter at higher positions, or arranges one or plural types of cartridges which are second recording and reproducing media, by putting smaller cartridges concentrically with disks alone, and larger cartridges by deviating the center in the moving direction of the tray and at higher positions, so as to be configured obliquely and vertically in the moving direction of the tray, and, in the first position of the tray, the holder keep a low position in the tray to mount either first or second recording and reproducing media, and if other than the media differing in the central position while moving to the second position of the tray, the holder moves in the tray in a direction of eliminating the central difference from the large cartridge deviated in the center obliquely upward so as to match the center of rotation of all recording and reproducing media, and it is also constituted to keep uniform the disk height in recording and reproducing.

To achieve the second object, the move between the first position and second position of the main chassis is rotatable only in the rotating direction about one axis by flexibility due to deflection, and for rotation about other axial direction, a support member having rigidity, for example, a leaf spring having an L-shaped section is fixed between the main chassis and casing or having viscoelastic members for absorbing and damping the vibration from casing and outside are interposed in the linking area of a support member and main chassis, the linking area of the support member and casing, and the linking member of the main chassis and other mechanical part.

To protect the head in the power cut-off state, in addition, a stationary member of, for example, a viscoelastic body is provided beneath the head, and the stationary member abuts against part of the head when the main chassis turns to the first position.

In thus composed first means of the invention, either the disk alone which is the first recording and reproducing medium, or the disk accommodated in a cartridge which is the second recording and reproducing medium can be mounted on the tray, the main chassis does not impede the transfer of the tray from the first position to the second position in the first position, and the main chassis is coupled with the driven part of the disk accommodated in the cartridge at a position keeping a clearance against the cartridge inner wall in the cartridge by the disk accommodated in the cartridge of the second recording and reproducing medium on the tray of the table at the second position, and, when using the disk alone of the first recording and reproducing medium instead of the cartridge, it acts to be coupled with the disk alone for keeping a clearance with the tray or auxiliary part at the same turntable position by the driven part.

In the second means, at the first position of the chassis, by recording or reproducing the recording disk alone by transferring to the second position by mounting the recording disk alone to the turntable on the chassis at the first position of the chassis, when using the cartridge incorporating the recording disk inside, the cartridge is held by cartridge holding means in the first position of the chassis and transferred to the second position, while the cartridge is pressed to fix the disk in the cartridge on the turntable to transfer into the apparatus, thereby recording or reproducing the information. In addition, by the function of the defining means, the head is defined with the casing, thereby preventing the user from directly touching the head to damage the precise head.

In the third means, in one recording and reproducing apparatus, recording disks accommodated in plural types of disk cartridges differing in size can be put in the holder on the tray, or one or plural types of recording disks alone differing in size and recording disks put accommodated in one or plural types of disk cartridges differing in size can be put, and the difference in the central positions of the recording disks alone differing in size and the plural cartridges differing in size accommodating the recording disks is absorbed by the move of the sub tray in the longitudinal direction, and the difference in the height of the recording disks is absorbed by the move of the sub tray in the vertical direction, and therefore the signals can be recorded or reproduced by mounting recording disks put in plural types of disk cartridges differing in size, or signals can be recorded or reproduced by mounting one or plural types of recording disks alone differing in size and recording disks accommodated in one or plural types of disk cartridges differing in size.

In the constitution for achieving the second object of the invention, by using an L-shaped leaf spring as supporting member of main chassis, elasticity may be assured only in the intended rotating direction, while rigidity is held in other axial direction, thereby obtaining a disk recording and reproducing apparatus eliminating looseness of main chassis against the casing, while keeping the function of rotary action of the main chassis. In addition, having an elasticity in the rotating direction, this elastic force can be used as reaction to balance with the gravity applied on the main chassis, so that the load applied on the motor for driving the loading mechanism may be alleviated.

Besides, by defining the position of the head with a moderate strength by a stationary member, the head is not moved unexpectedly if the power source is cut off, and hence handling is very easy.

BRIEF DESCRIPTION OF THE DRAWINGS

FIG. 3 (a) to (c) are sectional views showing the action of the disk recording and reproducing apparatus of the first embodiment of the invention.

FIG. 4 (a) to (c) are side sectional views showing the action when mounting the cartridge in the apparatus in FIG. 3 of the invention.

FIG. 11 is a side sectional view showing the action of its loading mechanism.

FIG. 14 is a side sectional view showing the action of loading mechanism in a fifth embodiment of the invention.

FIG. 15 is a side sectional view showing the action of loading mechanism in a sixth embodiment of the invention.

FIG. 16 is a schematic structural perspective view of a disk recording and reproducing apparatus in a seventh embodiment by the third means of solving of the invention.

FIG. 18 (a) to (d) are side sectional views showing the action of the loading mechanism when mounting a large-sized cartridge in the same.

FIG. 19 (b) is a sectional view showing the height relation in the loading mechanism when mounting a small-sized cartridge in the same.

FIG. 20 (a) to (d) are side sectional views showing the action of the loading mechanism when mounting a small-sized cartridge in the same.

FIG. 21 (a) to (d) are side sectional views showing the action of loading mechanism when mounting a large-sized disk in the same.

FIG. 22 (a) to (d) are side sectional views showing the action of loading mechanism when mounting a small-sized disk in the same.

FIG. 25 is a schematic structural perspective view of a disk recording and reproducing apparatus in the prior art.

FIG. 26 (a) to (c) are side sectional views showing the action of disk mounting in the prior art.

DETAILED DESCRIPTION OF THE EMBODIMENTS

Figure 1:
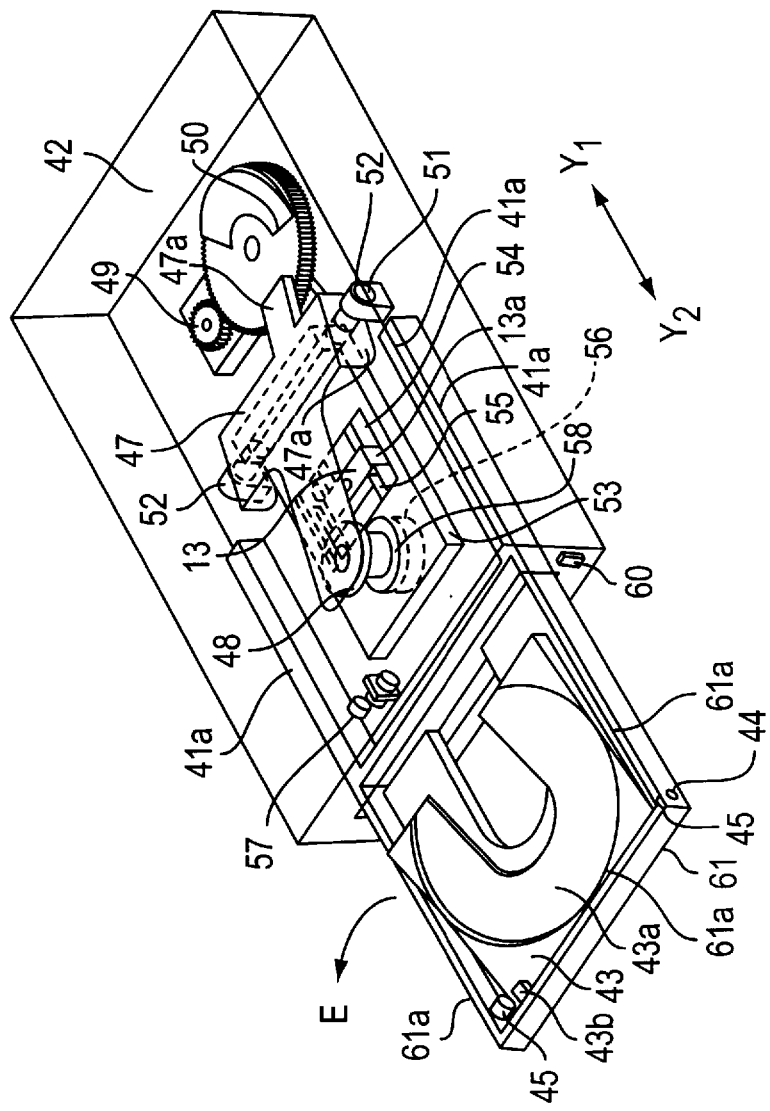
FIG. 1 is a perspective view showing a schematic constitution of a disk recording and reproducing apparatus in a first embodiment of the fist means of solving of the invention.

Referring now to the drawings, embodiments of disk recording and reproducing apparatus of the invention capable of using both recording and reproducing disks contained in cartridge and recording and reproducing disks alone are described in detail below.

FIG. 1 is a perspective view showing a schematic constitution of a disk recording and reproducing apparatus in a first embodiment by the first means of solving of the invention. In the drawing showing this embodiment, the parts common in constitution and operation as the prior art in FIG. 25 and FIG. 26 are identified with common reference numerals. That is, the head 13, casing 42, clamp arm 47, geared motor 49, cam 50, rotary support shaft 51, main chassis 53, guide shaft 55, disk motor 56, loading motor 57, turntable 58, and center cone 58a are same as in the prior art. These related control actions are controlled by the microcomputer, and the position detection of the cam 50 and tray 41 effected by driving of respective motors is usually effected by microswitch and the like, of which detail is omitted same as in the prior art.

A tray 61 is different from the tray 41 in FIG. 25 in that a holder 43 is fitted thereto as recording disk holding means. In the holder 43, a recess 43a for holding the recording disk is formed. A holder 43 is thrust into the direction of arrow E by a spring 45 by pivoting on shaft 44 rotatably in the drawing. On the outer circumference of the tray 61, a guide part 61a slightly larger than the cartridge 62 is formed, and when the cartridge 62 is mounted, it is designed to define the position by holding the cartridge 62.

How thus composed disk recording and reproducing apparatus operates is described below while referring to FIG. 3 (a), (b), (c), and FIG. 4 (a), (b). (c). By pressing an eject/load switch 60 provided at the front side of the casing 42, first the cam 50 is turned by the geared motor 49, and the clamp arm 47 and main chassis 53 are set in upper and lower departed positions across the rotary support shaft 51.

At this time, the downward turning angle of the main chassis 53 which is the first position may be smaller than in the prior art because of the inclination of the holder 43. By driving of the loading motor 57, the tray 61 begins to move in Y2 direction, and comes out of the casing 42 to the first position of the tray 61. This state is shown in FIG. 3 (a). In this state, the holder 43 is thrust in the direction of arrow E by the spring 45, and therefore if the recording disk 1 is put in the recess 43a of the holder, it is inclined by the angle F. Incidentally, the holder 43 is defined by the stopper part 43b formed at the end so as not to incline in the direction of arrow E more than angle F. From this state, the tray 61 is transferred into the apparatus by the loading motor 57 to be in the state of the second position of FIG. 3 (b). The center cone 58a is slightly set aside downward by slight downward rotation of the main chassis 53, but the recording disk 1 mounted on the holder 43 at this time is inclined upward by the angle F, and hence does not abut against the center cone 58a. In this way, by decreasing the downward rotational angle toward the main chassis 53, the height of the entire apparatus can be designed low.

After that the cam 50 is rotated by the geared motor 49, and the clamp arm 47 and main chassis 53 come closer to each other about the rotary support shaft 51 as shown in FIG. 3 (c), and the recording disk 1 is held between the clamper 48 and turntable 58 mounted on the shaft of the disk motor 56, and is engaged with the center cone 58a of the turntable 58 so as to be rotatable. Herein, the main chassis 53 comes to the second position. In this state, reproduction of information from the recording disk 1 or recording of information into it is effective by the head 13. When taking out the recording disk 1 from the apparatus, exactly a reverse action of the above loading operation is done.

The case of using the recording disk 63 accommodated in the cartridge 62 is explained by referring to FIG. 4 (a), (b), (c). Same as in the case of the independent disk of recording disk 1, by pressing the eject/load switch 60 on the front panel of the casing 42, the tray 61 is driven by the loading motor 57 and moves in Y2 direction, coming out of the casing 42. The cartridge is put on so that the tray 61 in this state may settle in the guide 61a. This state is shown in FIG. 4 (a). In this state, the holder 43 is nearly in a horizontal state by the weight of the cartridge 62. From this state, the tray 61 is transferred into the equipment by the loading motor 57 to be set in the state in FIG. 4 (b). The cartridge 63 mounted on the tray is only put on the holder 43, and is hence higher than the disk alone by the portion of the thickness, and will not abut against the center cone 58a of the turntable 58. Then the cam 50 is rotated by the geared motor 49, and the clamp arm 47 and main chassis 53 approach each other about the rotary support shaft 51 as shown in FIG. 4 (c), and the recording disk 63 in the cartridge 62 is held between the clamper 48 and turntable 58 mounted on the shaft of the disk motor 56, and is engaged with the center cone 58a to be rotatable. The position of the recording disk 63 inside the cartridge 62 at this time is pushed up by the center cone 58a, and rotates in a state being cleared from the inner wall of the cartridge 62. In this state, reproduction or recording of information from or to the recording disk 63 is effected by the head 13. The cartridge 62 is taken out of the apparatus in exactly the reverse action of the above action. If the cartridge 62 has a shutter for closing the window, an opening mechanism for it may be added so as to move the opening pawl in the shutter opening or closing direction by the driving force in the Y1 and Y2 direction.

Turning back the explanation, the recording disk 1 not put in the cartridge in FIG. 3 is also lifted to the same height as recording disc accommodated in the cartridge during rotation. That is, owing to the shape of the holder 43 in FIG. 1, the recording disk 1 is held in a lower position than the bottom of the cartridge 62 initially on the holder 43. On this recording disk 1, in order to rotate in a state being lifted from the inner wall of the cartridge 62, the center cone 58a pushes up the recording disk 63 in the cartridge 62, and its position should be same on the recording disk 1 not put in the cartridge, and therefore the recording disk 1 not put in the cartridge at this time will be lifted from the recess of the holder 43a not to contact with the holder 43a.

Figure 2:
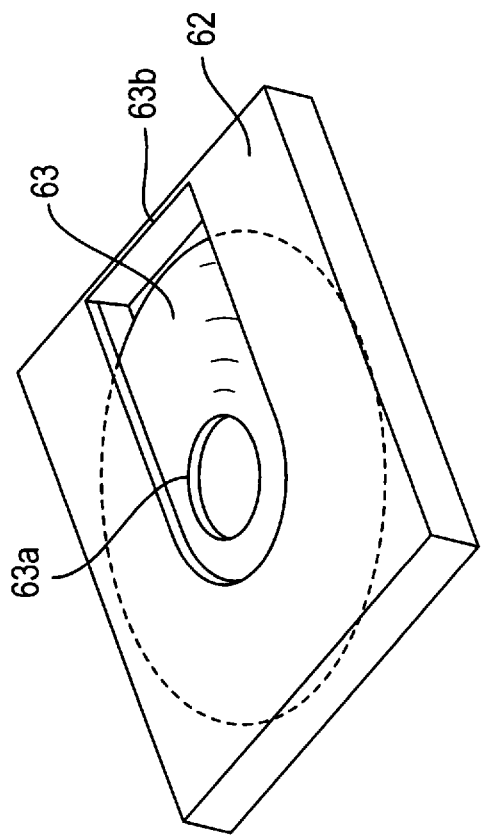
FIG. 2 is a structural perspective view of a cartridge used in an embodiment of the invention.
Figure 5:
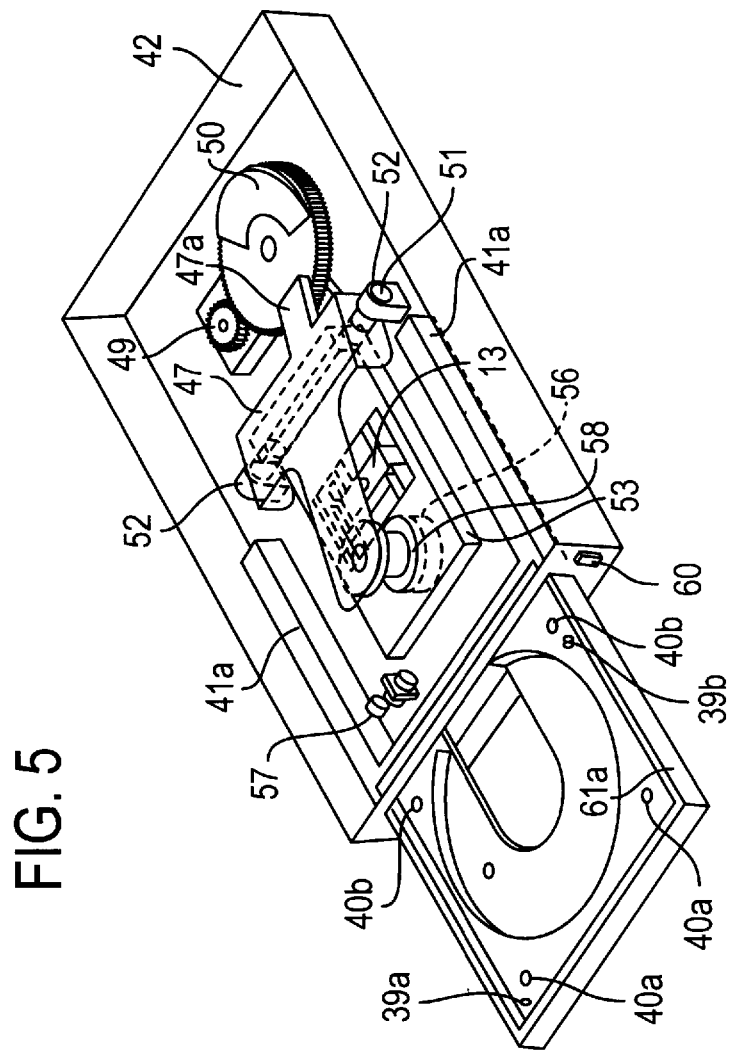
FIG. 5 is a schematic perspective structural diagram of a disk recording and reproducing apparatus in a second embodiment of the first means of solving of the invention.

A second embodiment having a similar structure to the above embodiment is described while referring to FIG. 5. In FIG. 5. on the top of the tray 61a, a detecting switch A of 39a, a detecting switch B of 39b, a positioning pin A of 40a, and a positioning pin B of 40b are provided. In this embodiment, the holder is in one body with the tray 61a. The other constitution is same as in FIG. 1, and the same reference numerals are given and explanations are omitted. The detecting switch A39a is for judging if the cartridge is put on or not, and it is used for varying the recording and reproducing conditions such as laser intensity of cartridge type disk, optical head control system, and disk motor rotary control system control method. The detecting switch B39b is used for realizing a desired recording and reproducing action by detecting code holes showing the prohibition of recording, type of record, and the like provided in the cartridge. Herein, the position and number of detecting switches A, B are not limited to this embodiment alone. The positioning pins A, B of 40a, 40b are not shown in the cartridge shape in FIG. 2, but have two or four notches for positioning provided in the cartridge in order to position accurately, and are intended to be engaged with the notches. By constituting as shown in FIG. 5, it is necessary to lower the turntable unit 58 mounted on the shaft of the disk motor below the example in FIG. 1 from the disk surface when loading, but the constitution may be further simplified.

The two examples above may be further combined, and detecting switches and positioning pins may be added to the embodiment in FIG. 1, and it is also possible to install a holder 43 thrust as shown in FIG. 1 in the second embodiment in FIG. 5.

Figure 6:
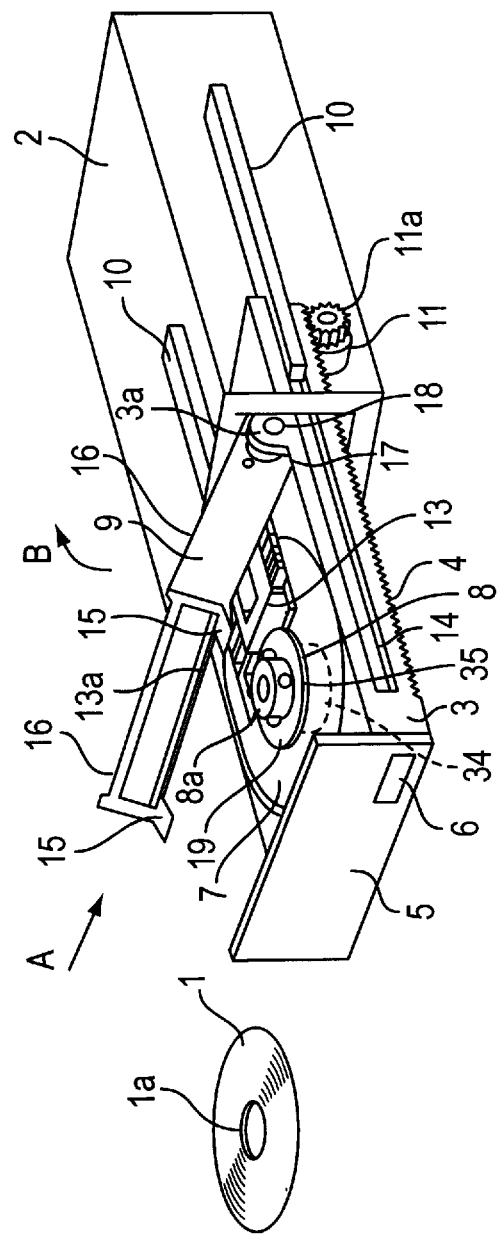
FIG. 6 is a schematic perspective structural diagram of a disk recording and reproducing apparatus in a third embodiment of the second means of solving of the invention.

A third embodiment by the second means of solving is explained. FIG. 6 is a schematic structural perspective view of the third embodiment. Reference numeral 1 is a recording disk used alone same as above, 2 is a casing for forming the housing of the apparatus, and 3 is a chassis on which a disk motor 34 having a turntable 19 and a head 13 are mounted. Reference numeral 4 is a rack formed beneath the chassis 3, which is engaged with a gear 11a provided on the output shaft of the loading motor 11 in the casing 2. Reference numeral 5 is a lid member fitted to the front part of the chassis, and 6 is an eject/load switch. Reference numeral 7 is a nearly circular recess formed on the top of the chassis, and is provided so that the recording disk 1 may not contact when the recording disk 1 is put on the turntable 19. Reference numeral 8 is a clamp mechanism, which is mounted on the turntable 19. The detail of the clamp mechanism 8 is described. Reference numeral 9 is a cartridge holder for holding the cartridge, and one end is rotatably pivoted on the bearing unit 3a of the chassis 3 by the shaft 18, and thrust in the direction of arrow B by a spring 17. Reference numeral 10 is a rail for guiding the chassis 3 in engagement with a groove 14 formed on the side of the chassis 3, and is fitted to both sides of the inside of the casing 2. On the cartridge holder 9, a dike-shaped guide portion 16 and a guide member 15 used as guide when inserting the cartridge from the direction of arrow A are formed. The bottom, not shown, is open.

Figure 7:
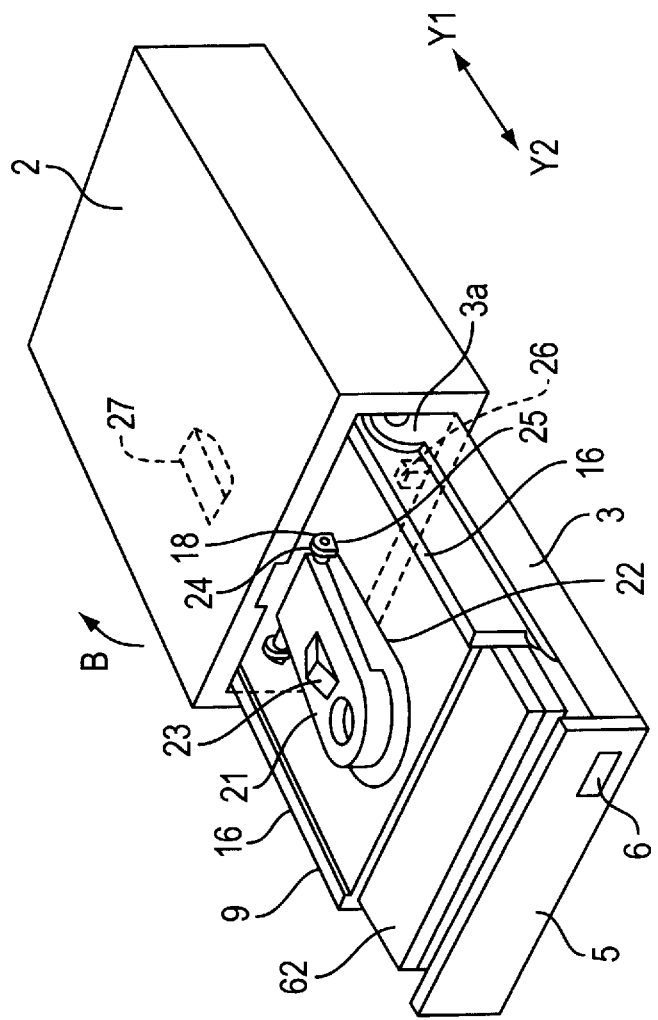
FIG. 7 is a schematic perspective structural diagram when mounting the cartridge of the same.

FIG. 7 is a schematic explanatory diagram showing the state of inserting the cartridge 62 into the cartridge holder 9 from the direction of arrow A in FIG. 6. In this state, the cartridge holder 9 is set nearly in horizontal state by the weight of the cartridge 62 in contact with the chassis 3. On the top of the cartridge holder 9, an abutting member 21 is rotatably supported by a bearing 25, and is configured to abut against the inner side of a central hole 63a of the recording disk 63 inside the cartridge 62 through the hole 22 above the cartridge holder 9. A spring 24 thrusts the abutting member 21 in the direction of arrow B. In the abutting member 21, a cam shape 23 is formed, and is configured to abut against a slant cam 27 provided on the top of the inside of the casing 2. A defining member 26 is provided inside the casing 2, and it is configured to abut against the head 13, and it functions to arrest exposure of the head to the outside of the casing 2 when the chassis 3 is transferred to the outside of the casing 2.

Figure 8A:
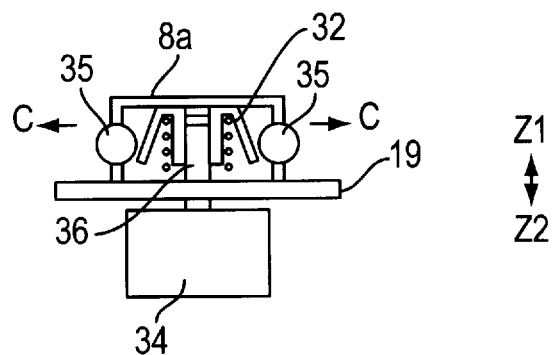
FIG. 8 (a) to (c) are side sectional views showing the schematic structure and operation of clamp mechanism in the third embodiment of the invention.
Figure 8B:
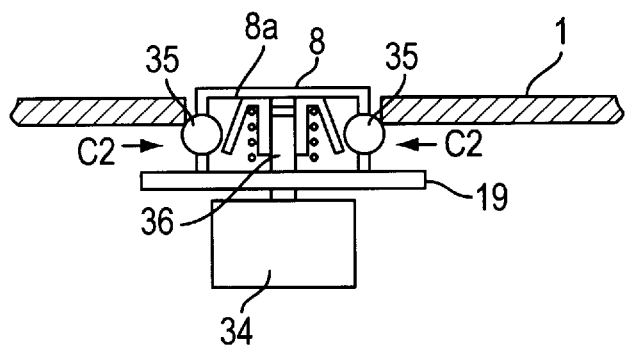
Figure 8C:
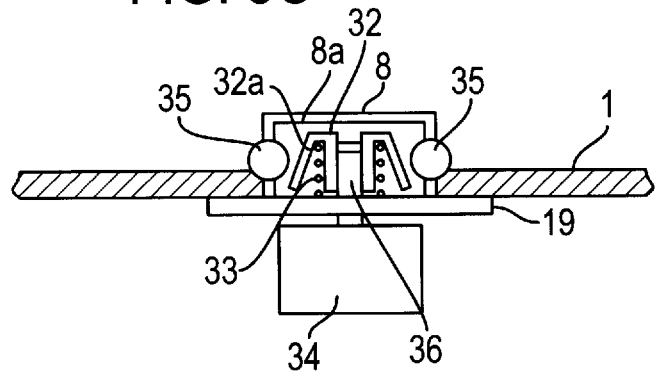

FIG. 8 (a), (b), (c) are structural explanatory diagrams of the clamp mechanism 8. The detail of the clamp mechanism 8 is described below. The clamp mechanism 8 is composed on the turntable 19. Reference numeral 8a is a cover having a nearly columnar shape, and contains three or four spherical balls 35 inside (only two are shown in FIG. 8 because it is a sectional view). The balls are held by the cover 8a so as not to dislocate outside. Reference numeral 32 is a cone shaped member, being guided by the shaft 36 of the disk motor 34, and is designed to slide in Z1 and Z2 directions, and is thrust in the direction of arrow Z1 by spring 33, so that the balls 35 are thrust in the direction of arrow C on the slope 32a on the outer circumference. As shown in FIG. 8 (b), when the recording disk 1 is mounted on the turntable 19, once the balls 35 move by resisting the spring force in the direction of arrow C2, and the recording disk is pushed downward in the direction of arrow Z2 to be in the state in FIG. 8 (c), when the balls 35 are thrust in the direction of arrow C, and the recording disk is pushed against the turntable 19. At this time, the balls 35 are thrust by the cone-shaped member 32, and pushed uniformly into the direction of arrow C. As a result, the recording disk 1 is precisely and nearly coaxially fixed on the shaft 36, so that the eccentricity may be kept small.

The position of the chassis 3 transferred by the loading motor 11 is detected by an ordinary microswitch or the like, and the user manipulates the eject/load switch 6, and so-called sequence control by microcomputer is effected. This is a conventional technology and details are omitted.

Figure 9A:
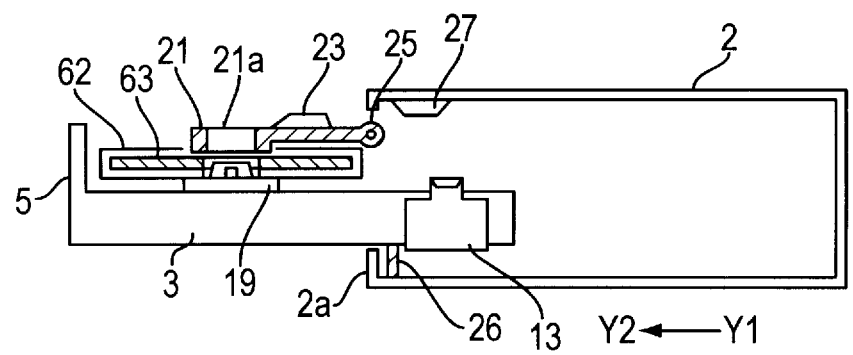
FIG. 9 (a) to (c) are side sectional views showing the action when mounting the cartridge in the third embodiment of the invention.
Figure 9B:
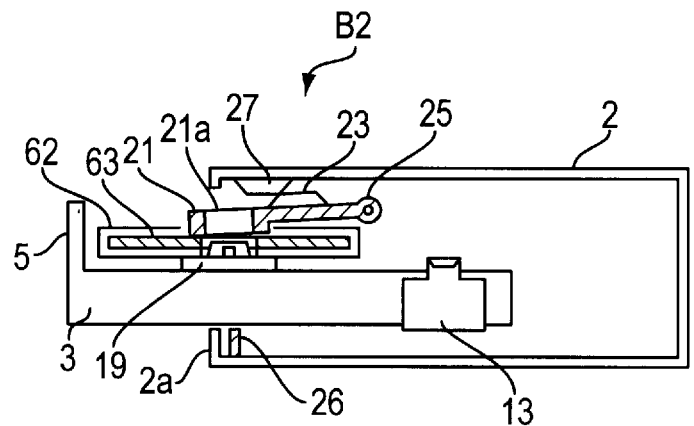
Figure 9C:
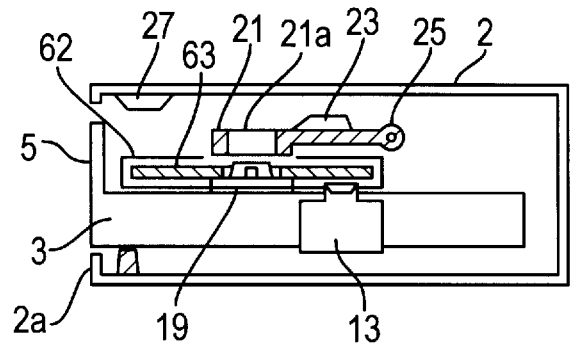

The operation of the apparatus in this constitution is explained by reference to FIG. 9. First, a case of using the recording disk 63 put in the cartridge is described. FIG. 9 (a), (b), (c) are explanatory diagrams of operation in this embodiment. When the cartridge 62 is inserted into the cartridge holder 9 on the chassis 3 at the first position of the apparatus in the state in FIG. 6, the state becomes as shown in FIG. 7 as mentioned above. The explanatory diagram of this state is FIG. 9 (a). In this state, the recording disk 63 in the cartridge 62 is only put on the clamp mechanism 8 as shown in the drawing, and is not completely positioned. The head 13 is defined by the defining member 26, and remains within the casing, being not exposed outside the casing. (In FIG. 6. for the sake of explanation, the head 13 is supposed to be outside the casing 2.) Next, when the chassis 3 is transferred in the direction of arrow Y1 into the casing 2, the cam shape 23 of the abutting member 21 abuts against the slant cam 27 provided on the top of the inside of the casing 2, and the abutting member 21 is pushed in the direction of arrow B2. As a result, the recording disk 63 inside the cartridge 62 is pus clamp mechanism 8 of the turntable 19. This is shown in FIG. 8 (b). Furthermore, when the chassis 3 is transferred in the direction of arrow Y1, the state is as shown in FIG. 8 (c), and the chassis 3 is completely put into the casing 2 in the state of second position, and, at the same time, the cam shape 23 of the abutting member 21 does not abut against the slant cam 27 any more, and the abutting member 21 does not contact with the recording disk. The defining member 26 is near the opening 2a of the casing 2, and does not abut against the head 13 in the state of the drawing. In this state, the recording disk 63 on the turntable 19 is rotated by the disk motor 34, and the signal can be recorded and reproduced by the head 13.

This embodiment shows to define the exposure of the head to outside the casing by the defining member 26, but it is also easy to devise an embodiment of composing defining means by, for example, holding the head 13 by the driving force of coil for linear motor in the direction of arrow Y1, so that the head 13 may not be exposed to the outside of the casing 2.

A case of using a recording disk alone 1 not contained in a cartridge is explained below. First, the user pushes the eject/load switch 6, and the chassis 3 is transferred to outside of the casing 2 to be in the state of FIG. 6. In this state, the cartridge holder 9 is inclined upward by the thrusting force of the spring 17 as shown in FIG. 6, and there is a space above the turntable 19, and therefore by matching the central hole 1a of the recording disk 1 with the center of the clamp mechanism 8, the user can easily mount on the turntable 19. Herein, when the user puts the recording disk on the turntable 19 and presses, the recording disk is positioned and fixed on the turntable 19 by the function of the clamp mechanism 8. When the eject/load switch 6 is pushed, the chassis 3 is transferred into the casing 2, and it is ready to record and reproduce same as mentioned above.

As explained herein, in the first means of solving, by thrusting the holder for single disk on the tray for mounting the disk in the vertical take-out direction, the holder sinks by the weight of the cartridge, when mounting the cartridge, so as to be nearly horizontal. Or, the constitution by omitting the holder is also possible.

In the second means of solving, the cartridge holder is thrust in the vertical take-out direction, and the disk contained in the cartridge is set in the cartridge holder, and the single disk is directly put and pressed on the turntable, and by adding such simple structure, both the single disk and disk contained in the cartridge can be handled by one apparatus, which brings about an enormous effect in expanding the application range.

In the embodiment, optical disks are explained, but it is evident that the invention may be applied in other media than optical recording and reproducing type, such as magnetic recording and reproducing type, and may be also applied in the mechanism for installing an apparatus making use of the recording medium of card type although the constitution for driving the medium may be somewhat different.

Figure 10:
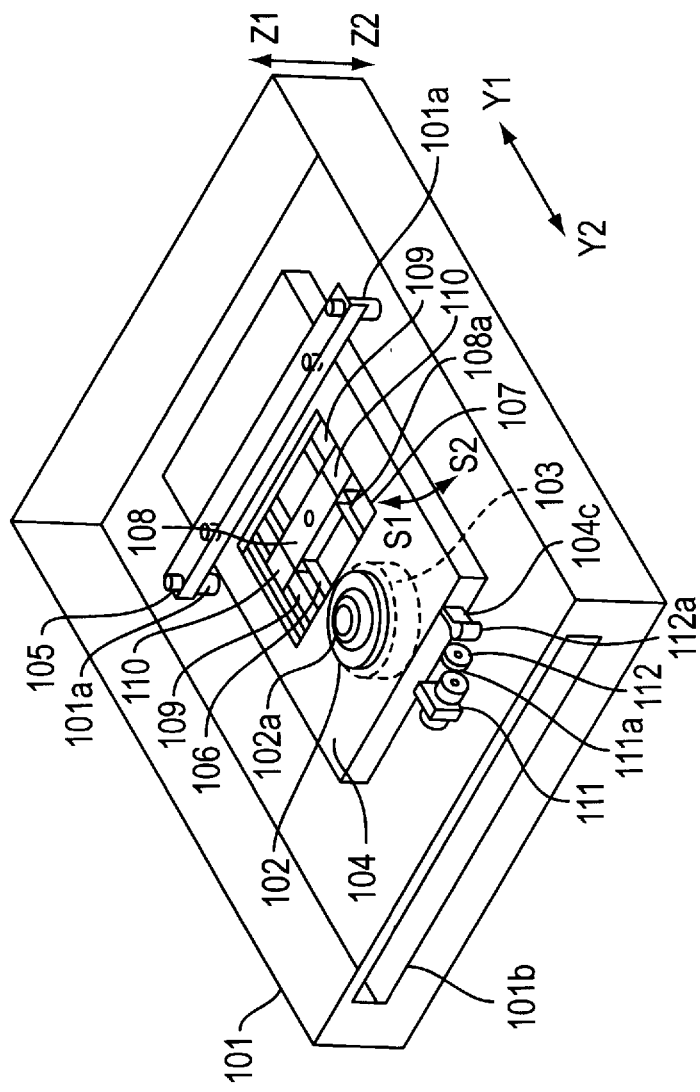
FIG. 10 is a perspective view of a disk recording and reproducing apparatus showing a fourth embodiment of the invention.

FIG. 10 and FIG. 11 relates to a different embodiment for avoiding a tremble or unnecessary vibrations by outer vibrations to the main chassis due to the gap between the rotary support shaft for main chassis and hole for rotary fulcum of main chassis. FIG. 10 is a perspective view showing the outline of the constitution of the fourth embodiment of a disk recording and reproducing apparatus of the invention. Reference numeral 101 is a casing, and two posts 101a are provided inside for fitting both ends of a leaf spring 105 with an L-shaped section. Reference numeral 102 is a turntable, which is engaged with the central hole 114a of the recording disk 114, and positions the recording disk 114. Reference numeral 103 is a disk motor, and the recording disk 114 is rotated by the turntable 102 directly coupled to the shaft. Reference numeral 104 is a main chassis, and the leaf spring 105 with an L-shaped section is attached thereto. Through this leaf spring 105, the main chassis 104 is fitted to the post 101a of the casing 101. Reference numerals 106, 107 are rails for a pickup 108 to run in the radial direction of the recording disk 114, and they are provided in the main chassis 104. The pickup 108 has the functions for recording signals in the recording disk 114 and reproducing the signals recorded in the recording disk 114. The pickup 108 has a bearing 108a for slidably supporting the pickup 108 by engaging with the rails 106, 107, and they are designed to be movable linearly in the direction of arrows Y1, Y2 in the drawing. Reference numeral 109 is a magnetic circuit for linear motor, and it is attached to the main chassis 104. Reference numeral 110 is a coil for linear motor, and it is fitted to the pickup 108. By the current flowing in the coil 110, the pickup 108 is driven in the direction of arrows Y1, Y2. Reference numeral 111 is a geared motor, and a pinion shaft 111a is fitted to the output shaft. Reference numeral 112 is a spur gear, which has a protruding shaft 112a at an eccentric position. The pinion gear 111a and spur gear 112 are engaged with each other, and the protruding shaft 112a is engaged with the protrusion 104c provided at the end of the main chassis 104.

Herein, the leaf spring 105 with an L-shaped section is high in rigidity and strong against the bending force in the direction of arrows Z1, Z2, and direction of arrows Y1, Y2, but is relatively weak to the torsional force in the direction of arrows R1, R2, and it also possesses an elasticity to return to the original shape under a specific rotation amount and torsional force. Accordingly, the main chassis 104 is high in rigidity and strong against the force in the direction of arrows Z1, Z2 and in the direction of arrows Y1, Y2, and is not deviated in position, but it is designed to rotate in the direction of arrows S1, S2 about the position of the leaf spring 105.

In thus constituted disk recording and reproducing apparatus, the operation is described by reference to FIG. 11 (a), (b), (c). FIG. 11 is a side sectional view of the fourth embodiment. When the recording disk 114 contained in the cartridge case 115 for protection is inserted from an inlet 101b of the casing 101 and pushed inside, it hits against a positioning plate 101c provided in the casing 101, and is almost fixed at a nearly coinciding position of the central hole 114a of the recording disk 114 and center of the turntable 102. In the state in FIG. 11 (a), (b), the main chassis 104 is inclined in the direction of arrow S2 as shown in the drawing. In this state, as understood from FIG. 11 (b), the center ring 102a of convex part in the middle of the turntable 102 is set aside in the direction of arrow S2 from the position of the cartridge case 115, and the cartridge case 115 is free to move in the direction of arrows Y1, Y2. From the state of FIG. 11 (b), the geared motor 111 operates, and the spur gear 112 is turned through the pinion gear 111a, and the protrusion 104c of the main chassis 104 engaged with the protruding shaft 112a moves in the direction of arrow S1. When the main chassis 104 comes to the position parallel to the recording disk 114, the center ring 102a and central hole 114a of the recording disk 114 are engaged with each other, and the recording disk 114 is positioned on the turntable 102. In the periphery of the central hole 114a of the recording disk 114, a metal hub 114b of magnetic material is fitted, and a magnet 102b is buried in the turntable 102, and by the magnetic force of this magnet 102b, the recording disk 114 is attracted and fixed on the turntable 102. In this state, the disk motor 103 is rotated, and the pickup 108 is scanned in the direction of arrows Y1,Y2, thereby recording signals in the recording disk 114 or reproducing recorded signals from the recording disk 114. When taking out the cartridge case 115 containing the recording disk 114 from the disk recording and reproducing apparatus, the geared motor 111 is rotated reversely, and the protrusion 104c of the main chassis 104 is moved in the direction of arrow S2. Coming into the state shown in FIG. 11 (b), the cartridge 115 containing the recording disk 114 is moved in the direction of arrow Y2, so that it can be taken out of the disk recording and reproducing apparatus.

Figure 12:
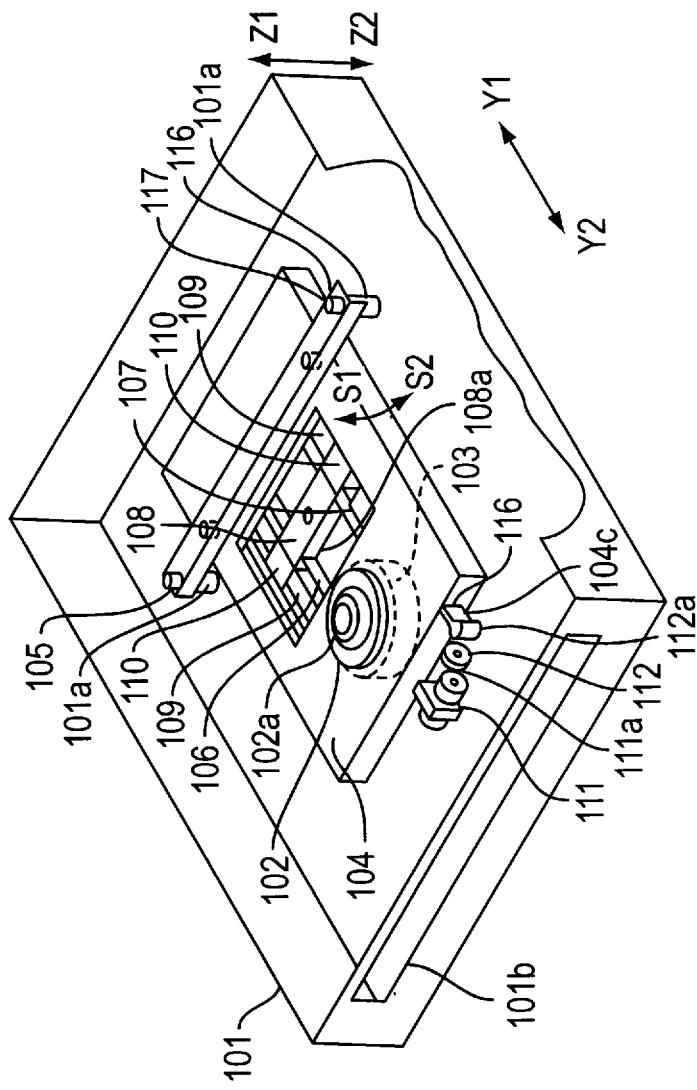
FIG. 12 is a perspective view of a disk recording and reproducing apparatus showing other embodiment of the invention.
Figure 13A:
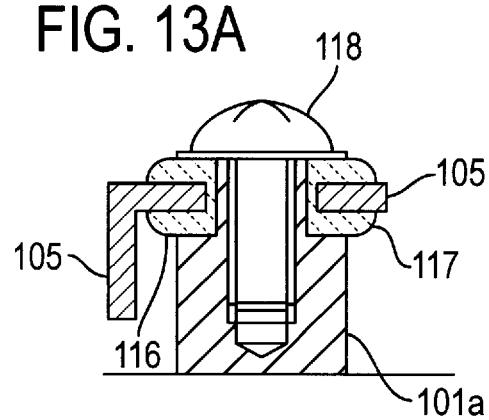
FIG. 13 (a), (b) are side sectional views showing its elastic body mounting part.
Figure 13B:
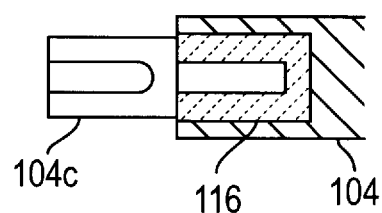

FIG. 12 is a perspective view showing the outline of structure of an embodiment by incorporating a viscoelastic body for absorption of vibration into the disk recording and reproducing apparatus in FIG. 10. FIG. 13 (a), (b) show sectional views of the mounting part of the viscoelastic body. Reference numerals 116 and 117 are viscoelastic bodies such as rubber and resin, and they absorb and damp the vibration transmitted to the main chassis 104 from the casing 101 and outside. Besides, by forming the support of the leaf spring 105 of an L-shaped section by steel plate having vibration control function, the vibration of the leaf spring 105 itself transmitting to the main chassis 104 through the casing and outside may be absorbed and damped. The viscoelastic bodies may not be limited to the examples above, but may include fibrous matter fixed and formed with adhesive fusion material, combination of rubber and resin, and members having both vibration absorbing property and a proper strength.

This embodiment relates to a disk recording and reproducing apparatus for one side only mounting one pickup, but it may be also applied in a disk recording and reproducing apparatus for two side mounting two pickups.

As the support member, the L-shaped leaf spring 105 is explained, but it may be replaced by any shape or material having elasticity only in the torsional direction, including a flat plate having a uniform thickness, T-shaped leaf spring, U-shaped leaf spring, X-shaped leaf spring, or the structure in the prior art shown in FIG. 25 improved in the looseness by thrusting the rotary bearing with a ring spring.

A fifth embodiment is described by referring to drawings. The embodiment relates to a method for the pickup (head) is held stably when moving the place of installation after turning off the power source in an inclined state of the chassis. FIG. 14(a). (b), (c) are sectional views showing the outline of constitution and operation of the embodiment incorporating the member for fixing the pickup 108 when discharging the recording disk into the casing in the disk recording and reproducing apparatus in FIG. 11, in which reference numeral 121 denotes a fixing member. In the state in FIG. 14 (a), (b), the main chassis 104 is inclined in the direction of arrow S2 as shown. As understood from FIG. 14, in this state, the pickup 108 abuts against part of the fixing member 121 assembled in the casing, and the action in the direction of arrows Y1, Y2 is fixed with a proper strength. In the state in FIG. 14 (c), the main chassis 4 and recording disk 114 are parallel, and the pickup 108 is cleared from contact with the fixing member 121, and is free to move in the direction of arrows Y1, Y2.

FIG. 15 is a side sectional view showing the outline of constitution and operation of a sixth embodiment incorporating a member for fixing the pickup when discharging the recording disk into the casing in the disk recording and reproducing apparatus in FIG. 11. Reference numeral 119 is a fixing plate and 120 is a fixing member. The fixing plate 119 is attached to a fixing plate support protrusion 101e in the casing 101, and is allowed to rotate about a fixing plate fulcrum 101f in the direction of arrows S1, S2. In the state in FIG. 15 (a), (b), the fixing plate 119 is always thrust in the direction of arrow S1 by its own spring force. The fixing member 120 is mounted on the fixing plate 119. In the state in FIG. 15 (a), (b), the main chassis 104 is inclined in the direction of arrow S2 as shown in the drawing. As shown in the drawing, in this state, since the main chassis 104 presses the fixing plate front end portion 119a, and fixing plate 119 is inclined in the direction of arrow S2, and part of the fixing member 120 abuts against the pickup 108, and fixes the motion of the pickup 108 in the direction of arrows Y1, Y2. In the state in FIG. 15 (c), the main chassis 104 and the recording disk 114 are parallel, and the thrusting force from the main chassis 104 applied on the fixing plate front end portion 119a is eliminated, and the fixing plate 119 also rotates in the direction of arrow S1 by its own spring force. The pickup 108 is cleared of contact with the fixing member 120, and is free to move in the direction of arrows Y1, Y2. When the contact is cleared, moreover, in order to arrest free motion of the fixing plate 119, it is also effective to thrust by inserting a permanent magnet or other attracting member between the casing 101 and fixing plate 119, or a proper spring at the 119a side near the fixing plate fulcrum 101f.

Fixing members used in the fifth and sixth embodiments are viscoelastic bodies such as rubber and resin, and it is also effective by using others, such as fibrous matter fixed and formed with adhesive fusion material, combination of rubber and resin, and brush made of multiple fine bristles of resin fibers.

In the foregoing embodiments, the optical disk apparatus using recording disks is shown, but it is also effective in the magnetic disk apparatus, or the scope of the invention also includes the apparatus using card type recording medium, which may differ only in the constitution of the disk motor unit if it is necessary to avoid contact of the main chassis with the medium when inserting the medium.

In the fourth to sixth embodiments, with the recording disk placed in the cartridge, fixing of the recording disk on the turntable 102 is achieved by making use of attraction by magnetic force, and it is applied to both the recording medium alone and the recording medium put in the cartridge as shown in FIG. 1, and also to the constitution which is fixed by the clamp mechanism as shown in FIG. 1.

The third means of solving of the disk recording and reproducing apparatus of the invention is described below. The third means of solving presents means for recording or reproducing signals by mounting recording disks accommodated in plural types of disk cartridges differing in size, or recording or reproducing signals by mounting one or plural types of recording disks alone differing in size and recording disks accommodated in one or plural types of disk cartridges differing in size. FIG. 16 is a perspective exploded view schematically showing the constitution of a disk recording and reproducing apparatus of a seventh embodiment by the third means of solving.

The constitution of the casing 201 is mainly described in the first place. In FIG. 16, inside the casing 201, there are two bosses 201a for fixing a torsion leaf 203 with an L-section fitted to the main chassis 202 with screw or other fixing means in the holes 203a at both ends. The top of the bosses 201a is slightly inclined downward to the direction of opening 201d, and therefore the front end portion 202a of the main chassis 202 is always thrust in the direction of arrow D when the torsion leaf 203 is fixed. Inside the casing 201, there is also a boss 201b for holding the shaft 201c for rotatably pivoting a main lever 204. When the chassis base 202 thrust in the direction of arrow D is driven by motor with reduction gear or other driving means not shown herein to rotate the main lever 204 in the direction of arrow R1, it is engaged with a notch 202b of the main chassis 202 by its slope 204a, and the front end portion 202a of the main chassis 202 is pushed up in the direction of arrow U by resisting the spring thrusting force of the torsion leaf 203, so that the main chassis 202 is nearly horizontal. When the main lever 204 is rotated in the direction of arrow R2. the main chassis 202 inclines from the horizontal position into the direction of arrow D by the spring thrusting force of the torsion leaf 203 along the slope 204a of the main lever 204.

The constitution around a tray 205 is described below. The tray 205 has the lower end 205b of its side wall 205a sliding on two guide ribs 201e provided at both sides in the casing 201, and a lid 207 for closing the top of the casing 201 guides the upper end 205c of the side wall 205a with a slight clearance to hold the tray 205 movably in the direction of arrows Y1–Y2, and an opening 201d for access of the tray 205 is provided ahead of the casing 201. The tray 205 is driven to enter and leave freely through the opening 201d by moving means, not shown herein, for driving, for example, the holder 43 in FIG. 1 in the first embodiment in the direction of arrows Y1–Y2. This opening 201d may be provided with a shutter, not shown herein, for opening outward in response to the move of the tray 205 in the direction of arrow Y2 as required. The sliding means of the tray 205 is not limited to the means described above, but the side wall 205a of the tray 205 may be held by upper and lower ribs, or a groove may be provided in the side of the tray 205 and one corresponding rib may be formed at the casing 201 side.

Besides, by varying the face, back, front and rear shapes of the cartridge, reverse insertion of cartridge in the face-back or front-rear direction can be avoided. That is, a protrusion is formed in a area not overlapping with the mounting face of the disk alone on the cartridge mounting face, and a relief recess is formed at the cartridge side so as to be installed smoothly, without being impeded by the protrusion, only when inserted in the correct position.

The constitution of moving the holder 206 on the tray 205 is explained.

There are four Z-shaped guide holes 205g in the tray 205, and four pins 206a of the holder 206 are engaged therewith to retain the holder 206 in the holder retaining part 205f.

The tray 205 has two pistons 205e, and the holder 206 retained in the holder retaining part 205f as being thrust by a piston spring 205d and projecting inward of the holder retaining part 205f is thrust in the direction of arrow Y2. Accordingly, it is also thrust in the direction of arrow Z1 along the slope of the Z-shaped guide holes 205g, and the holder 206 moves obliquely upward. Herein, the guide hole 205g is explained in a Z-form, but it is for the design purpose of stabilizing the height at both ends, and linear inclined guide holes may be also used.

The constitution of the holder 206 is explained. The top surface of the holder 206 has a complicated shape so as to mount plural types of cartridges containing recording disks and plural types of recording disks alone. Explained herein is an example of mounting large-sized cartridge A and small-sized cartridge B, and large-sized disk (recording disk) C and small-sized disk D. The mounting face 206b is a place for mounting the large-sized cartridge A, and the depth positioning is determined by a rib 206j. If necessary, although not shown herein, ribs may be provided on the periphery for retaining the cartridge A from around as position defining shape. The mounting face 206c is one step lower than the mounting face 206b, and the large-sized disk C is retained by this face and the edge 206d, and the small-sized cartridge B is retained by a mounting face 206c and the L-shaped edge 206e as the position defining shape at four positions, and the small-sized disk D is retained by a mounting face 206f and edge 206g.

The cartridge A is defined in position by the ribs 206j and side wall of the tray 205, and cartridge B is defined in position by four L-shaped edges 206e.

Two cartridge guide pins 210 planted on the main chassis 202 are engaged with an alignment hole of the cartridge A mentioned later through a hole 205f of the tray 205 and a slot 206h of the holder 206, thereby positioning. The cartridge guide pins 210 may be also planted on the tray 205. The engaging pins 206i provided at two rear positions of the holder 206 project downward from the slot 205h of the tray 205, and are positioned so as to be engaged with the engaging pins 201f of the casing 201 near the opening 201d when the tray 205 comes out from the opening 201d.

The detail of functional parts disposed on the main chassis 202 is described below. On the main chassis 202, a disk motor 209 having the turntable 208 coupled with its rotary shaft, and a head (pickup) 212 guided by two guide shafts 211 in the direction of Y1, Y2 are provided, and they are same as explained specifically in the first to sixth embodiments, and the detail is omitted herein.

The engagement of the turntable 208 and the recording disk alone or recording disk contained in cartridge may be achieved by clamping to the turntable 208 by the clamp arm as shown in the first to third embodiments, or retaining the recording disk by disposing a magnetic metal hub at the recording disk side and a magnet at the turntable 208 side, and attracting the metal hub by the magnet as shown in the fourth to sixth embodiments, and a mechanism necessary for each method may be provided.

In this constitution, the operation is described below. The operation of parts is conducted sequentially by microcomputer control same as mentioned in the preceding embodiments. By pressing the front eject/load switch 213 of the casing 201 is pressed, the main lever 204 is rotated in the direction of arrow R2 by driving means not shown, prior to discharge of the tray 205. Consequently, the main chassis 202 is thrust so as to incline in the direction of arrow D from the horizontal position by the spring thrusting force of the torsion leaf 203 along with the descent of the abutting part with the slope 204a of the main lever 204 abutting against the notch 202b of the main chassis 202. As a result, the turntable 208 descends to be lower than the bottom of the tray 205 to reach the first position of the main chassis 202. By moving means not shown, the tray 205 is guided from the opening 201d by two guide ribs 201e and lid 207 provided inside the casing 201, and discharged. Near the end of this action, two engaging pins 206i in the rear part of the holder 206 on the tray 205 are engaged with two engaging pins 201f provided inside the casing 201. The holder 206 is then pulled backward relatively to the tray 205 to be discharged. Since the four side pins 206a are engaged with four Z-shaped guide holes 205g of the tray 205, the holder 206 slides by resisting the pressure of the piston 205e in direction Y1 relatively to the tray 205, and also descends in direction Z2 relatively to the tray 205.

Figure 17:
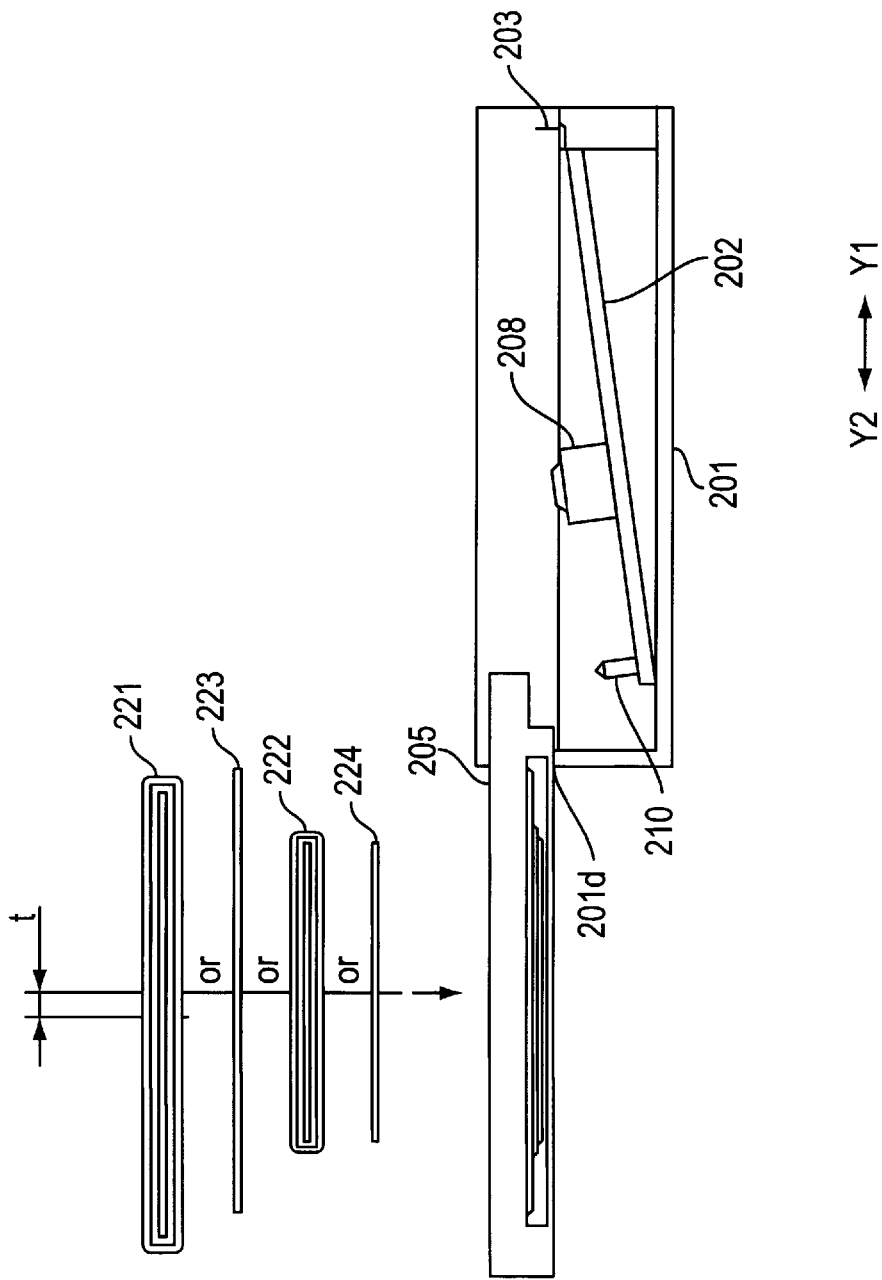
FIG. 17 is a side sectional view showing the configuration when mounting the recording medium on the holder in the same.

While the tray 205 is at the first position, the cartridge or disk is mounted on the holder 206. FIG. 17 is a schematic side sectional view showing this state. In the embodiment, it is supposed to mount four types of media, that is, large-sized cartridge A221, small-sized cartridge B222, large-sized disk C223 and small-sized disk D224.

The mounting face 206c in FIG. 16 is on e step lower than the mounting face 206b for mounting the large-sized cartridge A, and the large-sized disk C223 is held by this face and edge 206d, the small-sized cartridge B222 is held by the mounting face 206c and four L-shaped edges 206e, and the small-sized disk D224 is held by mounting face 206f and edge 206g. The edges 206d and edges 206g are formed concentrically, and their center and the center of the four L-shaped edge 206e coincide, and therefore when the disk 0223, disk D224 and cartridge B222, except for cartridge A221, are mounted on their holders 206, the central positions of the disks other than cartridge A221 and disk in the cartridge B222 are matched, and only the height is different by the difference in the place of mounting. By contrast, the center of the disk in the cartridge A221 is deviated by t only in the Y2 direction as shown in FIG. 17.

Figure 19A:
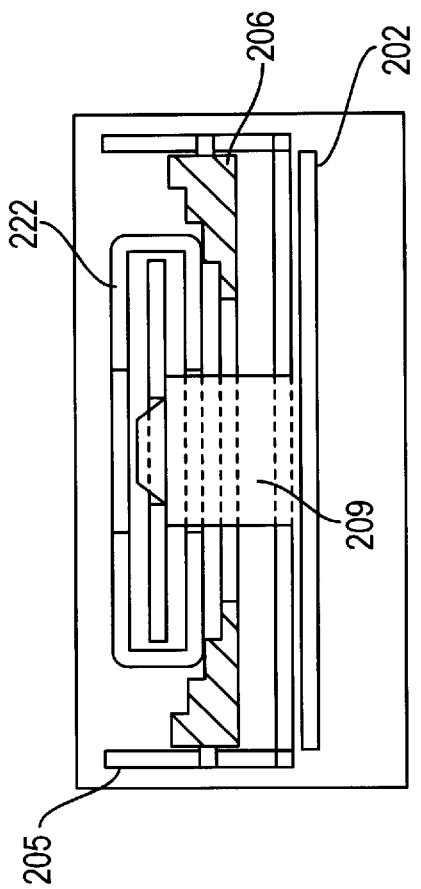
FIG. 19 (a) is a sectional view showing the height relation in the loading mechanism when mounting a large-sized cartridge in the same.
Figure 19B:
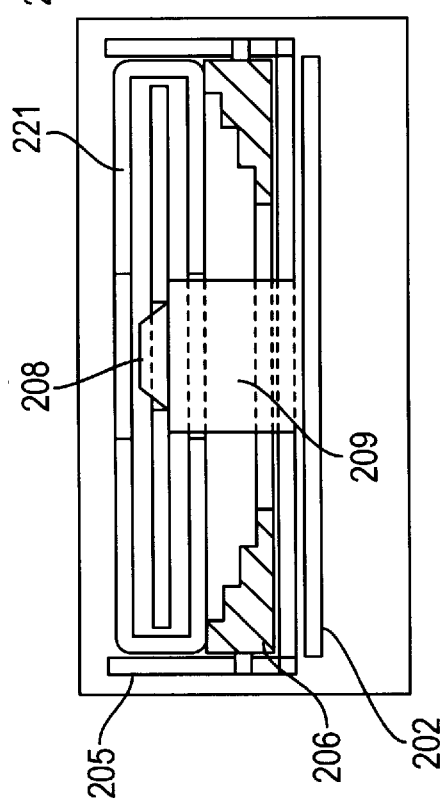

In FIG. 16, the plane for mounting the cartridges and disks on the holder 206 is explained so as to mount four types of cartridges and disks in three steps of height, but it may be also designed in four steps of height as shown in FIG. 17, and FIG. 19 (a), (b).

Referring to FIG. 18 to FIG. 22, this is to explain a case of loading in a disk recording and reproducing apparatus by mounting cartridge A221, cartridge B222, disk C223, and disk D224 on the respective holders 206. In FIG. 18 (a), the large-sized cartridge A221 is put on the holder 206 on the tray 205. When loading, by pressing the eject/load switch 213, the tray 205 is put into the casing 201 from the opening 201d by driving means (FIG. 18 (b)), but when moved about distance L, since the engagement of the engaging pins 201f and 206i in FIG. 16 engaged at the time of discharge is already canceled, the holder 206 receives a force in the direction of arrow Y2 by receiving the pressure of the piston 205e being thrust to the piston spring 205d inside the tray 205, but the large-sized cartridge A221 is mounted at the highest position of the holder 206, and the ascent is limited by the lid 207, and the dimensions of the cartridge A221 are kept fully between the rib 206j and tray front part, and the holder 206 cannot move relatively to the tray 205, and the tray 205 and holder 206 are directly put inside (FIG. 18 (c)). The state at this time is shown in FIG. 19 (a) in a sectional view as seen from the direction of the opening 201d. By the driving mechanism not shown, the main lever 204 is driven in the direction of arrow R1, and the main chassis 202 is pushed up nearly to the horizontal position by resisting the spring force of the torsion leaf 203, and the cartridge guide pin 210 is engaged with the alignment hole, not shown, in the bottom of the cartridge A221 to guarantee the height of the cartridge A221 relative to the main chassis 202, and the clearance including the face run-out in rotation between the cartridge and inside recording medium is maintained (FIG. 18 (d)). This state is the second position of the main chassis 202, and is the second position of the tray 205, too. When mounting of the cartridge A221 is completed, the disk motor 209 rotates, and the head 212 moves to specified position by transfer mechanism, thereby performing recording and reproducing actions.

In the case of the small-sized cartridge B222 in FIG. 20, the cartridge B222 is put on the holder 206 on the tray 205 as shown in FIG. 20 (a), and when moved about distance L when the tray 205 is accommodated inside from the opening 201d as shown in FIG. 20 (b), the engagement of the engaging pins 201f and 206a in FIG. 16 is already canceled, and the holder 206 receives a force in the direction of arrow Y2 by receiving the pressure of the piston 205e being thrust to the piston spring 205d inside the tray 205, and thereby the holder 206 has its four pins 206a moving in the direction of Y2 relatively to the tray 205 along the Z-shaped guide holes 205g, and moving also in the direction of arrow Z1 relatively, thereby moving by t in the direction Y2 relatively to the tray 205, and by d relatively in the direction Z1. As a result, the center deviation t relative to the large-sized cartridge A221 when mounting in FIG. 17 is canceled, and the centers of the media inside the large-sized cartridge A221 and small-sized cartridge B222 coincide with respect to the tray 205. By the move d in the height direction, the heights of the media inside the large-sized cartridge A221 and small-sized cartridge B222 are matched as shown in FIG. 19 (b). Accommodating the tray 205 up to the specified position (FIG. 20 (c)), by thrusting the cartridge B222 mounted on the mounting face 206c of the holder 206, for example, from above, the height of the cartridge relative to the main chassis 202 is guaranteed, and the clearance including the face run-out in rotation between the cartridge and inside recording medium is guaranteed. In this manner, too, since the pin 206a is provided in the linear portion of the Z-shaped guide holes 205g, the holder 206 is not lowered if receiving pressure from above. By the subsequent elevation of the main chassis 202, driving of medium is enabled same as in FIG. 18 (FIG. 20 (d)).

In the case of the disk C, disk D in FIG. 21, FIG. 22, by mounting the disks on specified positions of the tray 206, when the eject/load switch 213 is pressed, the holder 206 moves relatively by t, d in the directions of Y2, Z1, relatively to the tray 205 same as in the case shown in FIG. 20. As mentioned above, since the centers of the small-sized cartridge B222 and disk C223 and disc D224 are identical, the problem is the height of the disk in the case of FIG. 21 (d), FIG. 22 (d). but, as seen from FIG. 16, the mounting face 206c of the small-sized cartridge B222 and mounting face of disk C are identical, and the medium of the small-sized cartridge B222 is held at a position higher than the mounting face 206c by the turntable 208, and therefore the disk C223 is also held at a position higher than the mounting face 206c, so that the disk C223 will not contact with the mounting face 206c. Similarly, the disk D224 mounted on the lower mounting face 206f is held by the turntable 208 on the same plane as the disk C223, and hence will not contact with the mounting face 206f.

When discharging the recording medium after recording or reproducing, by pressing the eject/load switch 213, in exactly reverse procedure of mounting of recording medium, first the main chassis 202 is lowered, then the tray 205 is discharged. At this time, the height of the large-sized cartridge A is not changed, but the cartridge B222, disk C223 and disk D224 are discharged in a state being lowered to the initial mounting position of the holder 206.

The countermeasure for power failure is described below. When the main chassis 202 is elevated to the horizontal position or nearly the reto by rotation of the main lever 204 in the direction of arrow R1, for driving the medium, the turntable 208 is inserted into the recording and reproducing medium, and when power failure occurs in this state, the main lever 204 is not moved, and the tray 205, that is, the recording medium cannot be taken out. To prevent this, by pressing the forced eject pin 214 from the hole 201g provided at the front side of the casing 201 in the direction of arrow Y1, and by rotating the main lever 204 by its front end in the direction of arrow R2, the main chassis 202 is lowered in the direction of arrow D, and the recording and reproducing medium and the turntable 208 are separated, and the tray 205 can be drawn out manually.

Although not particularly shown in example, means for detecting presence or absence of type of cartridge or prohibition of recording when the cartridges A221, B222 are mounted on the holder 206 may be disposed in any one of the holder 206, tray 205, and main chassis 202. Examples may include the detection switch A39a and detection switch B39b in FIG. 5 in the second embodiment. In particular, the cartridge A221 can detect mounting of the large-sized cartridge by making use of the fact that the holder 206 is not moved in the tray 205.

Figure 23:
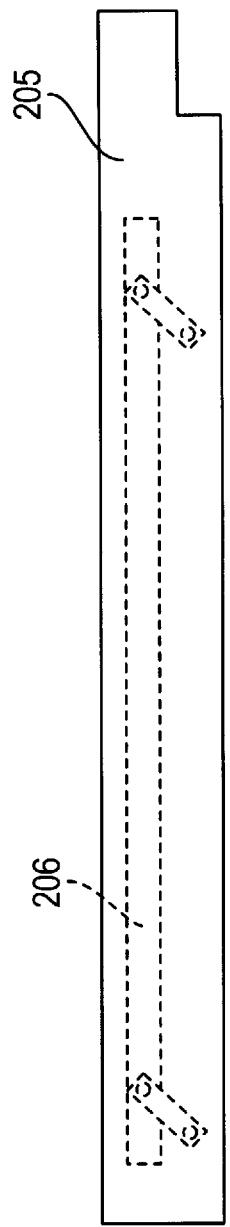
FIG. 23 is a side view showing other embodiment for moving the holding on the tray in the same.

The move of the holder 206 relative to the tray 205 in Y1–Y2 direction and Z1–Z2 direction is not limited to the one shown in FIG. 16, but it may be achieved by the link mechanism as shown in FIG. 23, which may be understood easily.

Thus, according to the embodiment, on the tray 205, the piston 205e thrust by the piston spring 205d projects into the holder retaining part 205f of the tray 205 in the direction of arrow Y2, and the holder 206 having four pins 206a engaged with four Z-shaped guide holes 205g of the tray 205 in the recording and reproducing state of the recording medium is thrust in the direction of arrow Y2 while retaining within the holder retaining part 205f, and is also thrust in the direction of arrow Z1 along the Z-shaped guide holes 205g, and in the constitution by using such oblique elevating means, the central positions and heights of the recording media of the plural types of cartridges and single disks can be matched.

Thereby it presents means for recording or reproducing signals by mounting recording disks accommodated in plural types of disk cartridges differing in size, or recording or reproducing signals by mounting one or plural types of recording disks alone differing in size and recording disks accommodated in one or plural types of disk cartridges differing in size.

Figure 24:
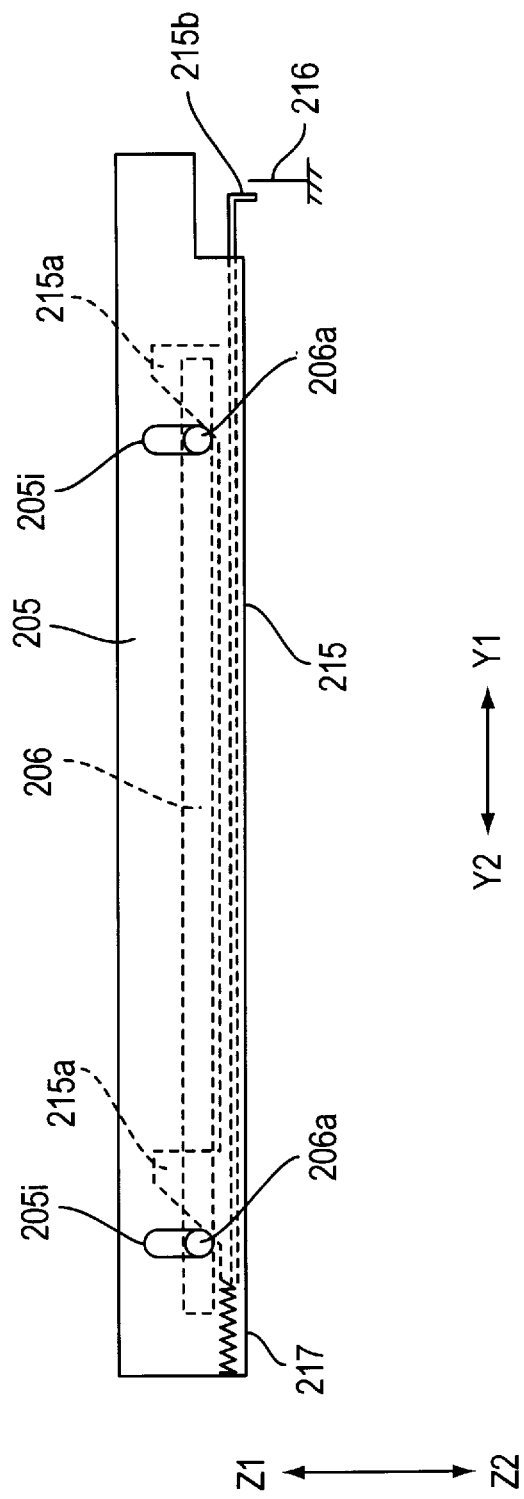
FIG. 24 is a side view showing another embodiment for moving vertically the holder on the tray in the same.

An eighth embodiment of the invention is described below while referring to the drawing. FIG. 24 is a side sectional view showing the outline of the eighth embodiment. The feature of this embodiment lies in the constitution of the tray and holder, and other parts are supposed to be same as in the seventh embodiment in FIG. 16. In the side wall 205a of the tray 205, instead of the Z-shaped guide holes 205g, four guide holes 205i are provided, and four pins 206a of the holder 206 are engaged therewith. Between the holder 206 and tray 205, a slider 215 having the slope 215a is held, and is thrust in the direction of arrow Y1 by the spring 217. In the case of this embodiment, all cartridges and disks are mounted on the holder 206 so that the centers may coincide.

When the tray 205 incorporating the holder 206 for mounting cartridges or disks is mounted on the recording and reproducing apparatus from the opening 201d of the casing 201, the engaging spring 216 provided in the casing 201 and the engaging part 215b at the end of the slider 215 are engaged just before the final point, the slider 215 has its slope 215a engaged with four pins 206a of the holder 206, and the pins 206a are pushed up in the direction of arrow Z1, so that the holder 206 also rises in the direction of Z1.

In this case, the one not required to be raised such as the cartridge A221 is prevented from rising by the lid 207, for example, and it is absorbed by the elasticity of the engaging spring 216 so that excessive load may not be applied to the engaging part 215b. In this case, on the tray, such one as the piston 205e thrust by the piston spring 205d as in the seventh embodiment may not be used.

In the case of vertical elevation, not limited to this example, other method may be also employed. Same as in the seventh embodiment, moreover, means for judging the shape of cartridge may be disposed.

Thus, according to the embodiment, by retaining the holder 206 having the four pins 206a engaged with four vertical guide holes 205i of the tray 205 in the holder retaining part 205f, thrusting in the direction of arrow Y1 between them by the spring 217, and holding the slider 215 having the slope 215a, in the constitution using the elevating means by the slope 215a of the slider 215 by engaging with the engaging spring 216 fixed on the casing 201 just before mounting of the recording medium on the recording and reproducing position, the central positions and heights of the plural types of cartridges and single disks can be equalized.

It thereby presents means for recording or reproducing signals by mounting recording disks accommodated in plural types of disk cartridges differing in size, or recording or reproducing signals by mounting one or plural types of recording disks alone differing in size and recording disks accommodated in one or plural types of disk cartridges differing in size.

In the first, second, seventh and eighth embodiments, the main chassis mounting the turntable for holding the head and recording medium is elevated by rotating means toward the tray mounting recording medium, but it is not limited to rotary elevation, and the function is not different if it is, for example, vertical elevation.

As described herein, according to the disk recording and reproducing apparatus of the invention, in the first means of solving, the tray capable of mounting both the recording and reproducing disks alone and cartridges accommodating recording and reproducing disks, and moving between the recording and reproducing position and the recording medium mounting position is used, or the holder being thrust in the vertical take-out direction and capable of mounting both the recording and reproducing disks alone and cartridges accommodating recording and reproducing disks is disposed on the tray, and in the second means of solving, in the constitution by adding a holder for mounting the cartridge on the chassis for moving between the recording and reproducing position and recording medium mounting position, by setting the turntable drive by the disk motor according to the height of the cartridge accommodating the recording and reproducing disk, the recording disk alone or the recording disk contained in the cartridge may be recorded or reproduced by one apparatus.

In the third means of solving, in addition to the constitution of the first means of solving, by disposing the holder capable of moving obliquely upward or up and down vertically on the tray on the tray, by correcting the difference of central positions of the cartridge and disk, or correcting the difference of the disk height, and hence it is possible to record or reproduce signals by mounting recording disks accommodated in plural types of disk cartridges differing in size, or record or reproduce signals by mounting one or plural types of recording disks alone differing in size and recording disks accommodated in one or plural types of disk cartridges differing in size. That is, it is possible to record or reproduce signals by mounting plural types of recording disks alone differing in size, and to record or reproduce signals by mounting recording disks accommodated in plural types of disk cartridges differing in size. It is further possible to record or reproduce signals by mounting one or plural types of recording disks alone differing in size and recording disks accommodated in one or plural types of disk cartridges differing in size.

Using a member by making use of elasticity by torsion in rotation of the chassis, or preventing vibration from casing or outside by combined use of viscoelastic body for absorbing vibration, it is possible to handle easily while avoiding unexpected move or damage of the head when not in use by fixing member of viscoelastic body or the like, and practical effects are great.

These embodiments may be combined and the constituent elements in the embodiments may be exchanged.

The invention is not limited to the illustrated embodiments alone, but various changes and modifications are possible within a scope of true spirit of the invention.

What is claimed is:

1. A recording and reproducing apparatus for a disk or for a disk cartridge, said disk cartridge having a mounted disk within a cartridge, comprising:

a chassis comprising,
   a turntable for receiving the disk or the mounted disk, and
   a head for recording onto or reproducing from the disk or the mounted disk,
   said chassis being movable between a first position and a second position,
a tray having side walls for holding a disk cartridge located on the tray, said tray being movable between a first tray position and a second tray position, and
a holder settled on the tray comprising,
   a flat portion for supporting the disk cartridge,
   a disk shaped recess in said flat portion of the holder for mounting the disk, and
   an aperture for preventing the holder from interfering with the chassis' turntable or head,
   said holder being inclined in a direction apart from the tray for preventing the disk or disk cartridge from interfering with the turntable,
   wherein,
      either the disk or the disk cartridge is placed on the tray at the first tray position,
      the disk or the mounted disk is loaded on the turntable at the second tray position when the chassis is at the second position, and
      said turntable always receives the disk or the mounted disk at a same position.

2. A recording and reproducing apparatus for a disk or for a disk cartridge, said disk cartridge having a mounted disk within a cartridge, comprising:

a case,
a chassis comprising,
   a turntable for receiving the disk or the mounted disk,
   a head for recording onto or reproducing from the disk or the mounted disk,
   said chassis being movable between a first position drawn out from the case and a second position drawn into the case,
a holder hinged to the chassis above the turntable, said holder being movable hinge-like between a first holder position for inserting the cartridge and a second holder position for loading the mounted disk on the turntable, having an aperture through its bottom surface for preventing the holder from interfering with the disk on the turntable, and moving from the first holder position to the second holder position when the chassis moves from the first position to the second position, wherein,
   the disk cartridge being inserted in the holder at the first holder position and the mounted disk is loaded on the turntable at the second holder position when the chassis is at the second position, or the disk is loaded directly on the turntable when the holder is at the first holder position and the chassis is at the first position, and said turntable always receives the disk or the mounted disk at a same position.

3. The recording and reproducing apparatus of claim 2, with the disk or the mounted disk having a central aperture, and further comprising a disk motor with a shaft, a means for pressing the disk or the mounted disk against the turntable and with the turntable having plural balls disposed in a state being thrust outward in a radial direction outward from the shaft of the disk motor, and a guide member for guiding the central aperture of the disk or the mounted disk.

4. The recording and reproducing apparatus of claim 2, further comprising a means for moving the head in a direction away from the turntable while the chassis moves from the second position to the first position.

5. A recording and reproducing apparatus for a disk cartridge, said disk cartridge having a mounted disk within a cartridge, comprising:
 a chassis comprising,
  a turntable for receiving the mounted disk, and
  a head for recording onto or reproducing from the mounted disk,
  said chassis being movable between a first position and a second position,
 a tray being movable between a first tray position and a second tray position,
 a holder settled on the tray having a mounting space formed in steps with coinciding centers for holding one of a plurality of different sized disk cartridges, said holder being able to move vertically from a bottom position to a top position in the tray,
 a thrusting means for thrusting the holder to ascend from the bottom position during the movement of the tray from the first tray position to the second tray position, and
 a stopper means for limiting the ascent of the disk cartridge on the holder such that the mounted disk is stopped not beyond a specific vertical position irrespective of the disk cartridge size, said specific vertical position is defined as a vertical position of the mounted disk when a largest sized disk cartridge is held on the holder which is at the bottom position,
 wherein,
  the disk cartridge is placed in the holder at the first tray position and the mounted disk is loaded on the turntable at the second tray position, and
  said turntable always receives the mounted disk at the specific vertical position and at the coinciding centers.

6. A recording and reproducing apparatus for a disk or for a disk cartridge, said disk cartridge having a mounted disk within a cartridge, comprising:
 a chassis comprising,
  a turntable for receiving the disk or the mounted disk,
  a head for recording onto or reproducing from the disk or the mounted disk,
  said chassis being movable between a first position and a second position,
 a tray being movable in a direction between a first tray position and a second tray position,
 a holder settled on the tray having a disk a disk cartridge mounting space formed as one or a plurality of steps of successively smaller disk cartridge mounting spaces with coinciding centers and having a disk shaped recess formed as one or a plurality of steps of successively smaller disk shaped recesses with said coinciding centers for holding one of a plurality of different sized disks or one of a plurality of different sized disk cartridges, said holder being able to move vertically from a bottom position to a top position in the tray,
 a thrusting means for thrusting the holder to ascend during the movement of the tray from the first tray position to the second tray position,
 a stopper means for limiting the ascent of the disk or the disk cartridge on the holder such that the disk or the mounted disk is stopped not beyond a specific vertical position irrespective of the disk size or the disk cartridge size, said specific vertical position is defined as a vertical position of the mounted disk when a largest sized disk cartridge is held on the holder which is at the bottom position,
 wherein,
  the disk or the disk cartridge is placed in the holder at the first tray position and the disk or the mounted disk is loaded on the turntable at the second tray position, said turntable always receives the disk or the mounted disk at the specific vertical position and at the coinciding centers.

7. A recording and reproducing apparatus for a disk cartridge, said disk cartridge having a mounted disk within a cartridge, comprising:
 a chassis comprising,
  a turntable for receiving the mounted disk,
  a head for recording onto or reproducing from the mounted disk,
  said chassis being movable between a first position and a second position,
 a tray being movable in a direction between a first tray position and a second tray position,
 a holder settled on the tray having a mounting space formed in steps with a first center of the mounted disk in a largest sized disk cartridge and with coinciding second centers of the mounted disks in other sized disk cartridges for holding one of a plurality of different sized disk cartridges, said holder being able to move vertically from a bottom position to a top position and also horizontally from a first end position to a second end position in the tray,
 a thrusting means for thrusting the holder to ascend and to move horizontally during the movement of the tray from the first tray position to the second tray position,
 a stopper means for limiting the ascent and the horizontal movement of the disk cartridge on the holder such that the mounted disk is stopped not beyond a specific vertical position and at a specific horizontal position irrespective of the disk cartridge size, said specific vertical position being defined as a vertical position of the mounted disk when the largest sized disk cartridge is held on the holder which is at the bottom position, said specific horizontal position being defined as a horizontal position of the mounted disk when the largest sized disk cartridge is held on the holder which is at the first end position,
 wherein,
  the disk cartridge is placed in the holder at the first tray position and the mounted disk is loaded on the turntable at the second tray position, said turntable always receives the mounted disk at the specific vertical position and at the specific horizontal position.

8. A recording and reproducing apparatus for a disk or for a disk cartridge, said disk cartridge having a mounted disk within a cartridge, comprising:
- a chassis comprising,
  - a turntable for receiving the disk or the mounted disk,
  - a head for recording onto or reproducing from the disk or the mounted disk,
  - said chassis being movable between a first position and a second position,
  - a tray being movable between a first tray position and a second tray position,
  - a holder settled on the tray having a disk cartridge mounting space formed as one or a plurality of steps of successively smaller disk cartridge mounting spaces with a first center on the mounted disk in a largest sized disk cartridge and with coinciding second centers of the mounted disks in other sized disk cartridges and having a disk shaped recess formed as one or a plurality of steps of successively smaller disk shaped recesses with the coinciding second centers of the mounted disks for holding one of a plurality of different sized disk cartridges or one of a plurality of different sized disks, said holder being able to move vertically from a bottom position to a top position and also horizontally from a first end position to a second end position in the tray,
  - a thrusting means for thrusting the holder to ascend and move horizontally during the movement of the tray from the first tray position to the second tray position,
  - a stopper means for limiting the ascent and the horizontal movement of the disk or the disk cartridge on the holder such that the disk or the mounted disk is stopped not beyond a specific vertical position and at a specific horizontal position irrespective of the disk or the disk cartridge size, said specific vertical position being defined as a vertical position of the mounted disk when the largest sized disk cartridge is held on the holder which is at the bottom position, said specific horizontal position being defined as a horizontal position of the mounted disk when the largest sized disk cartridge is held on the holder which is at the first end position,
  - wherein,
    - the disk or the disk cartridge is placed in the holder at the first tray position and the disk or the mounted disk is loaded on the turntable at the second tray position, said turntable always receives the disk or the mounted disk at the specific vertical position and at the specific horizontal position.

9. The recording and reproducing apparatus of claims 1, and 5, further comprising a fixing member disposed beneath the head and abutting against a part of the head when the chassis moves to the first position.

10. The recording and reproducing apparatus of claim 9, with said fixing member being composed of viscoelastic material.

11. The recording and reproducing apparatus of claims 1, 5, 6, 7, and 8 further comprising a fixing member adhered on a fixing plate oscillatably held about a fulcrum, such that when said fixing member abuts against a part of the fixing plate as the chassis moves to the first position, part of the fulcrum is lifted and the fixing member abuts against a part of the head.

12. The recording and reproducing apparatus of claims 1, 5, 6, 7, and 8 wherein the chassis moves between the first and second positions.

13. The recording and reproducing apparatus of claims 1, 5, 6, 7 and 8 further comprising:
- a casing for accommodating the chassis;
- a torsion leaf spring having an L-shaped section for supporting the chassis to the casing, said torsion leaf spring forcing the chassis in a direction toward the first position.

14. The recording and reproducing apparatus of claim 13 further comprising:
- a viscoelastic material interposed between the torsion leaf spring and the chassis, between the torsion leaf spring and the casing, and between the chassis and other mechanical parts for absorbing and damping vibrations.

* * * * *